US012561772B2

(12) United States Patent
Zhao et al.

(10) Patent No.: US 12,561,772 B2
(45) Date of Patent: Feb. 24, 2026

(54) DISPLAY APPARATUS AND OPERATING METHOD THEREOF

(71) Applicant: SAMSUNG ELECTRONICS CO., LTD., Suwon-si (KR)

(72) Inventors: Chun Zhao, Suwon-si (KR); Jonghwan Kim, Suwon-si (KR); Guiwon Seo, Suwon-si (KR); Younghoon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 340 days.

(21) Appl. No.: 18/106,260

(22) Filed: Feb. 6, 2023

(65) Prior Publication Data

US 2023/0186440 A1 Jun. 15, 2023

Related U.S. Application Data

(63) Continuation of application No. PCT/KR2022/017793, filed on Nov. 11, 2022.

(30) Foreign Application Priority Data

Nov. 11, 2021 (KR) ........................ 10-2021-0155161

(51) Int. Cl.
*G06T 5/92* (2024.01)
*G06T 5/20* (2006.01)
(Continued)

(52) U.S. Cl.
CPC .................. *G06T 5/92* (2024.01); *G06T 5/20* (2013.01); *G06T 5/50* (2013.01); *G06T 5/94* (2024.01);
(Continued)

(58) Field of Classification Search
CPC .... G06T 5/92; G06T 5/20; G06T 5/50; G06T 5/94; G06T 2207/10024;
(Continued)

(56) References Cited

U.S. PATENT DOCUMENTS 8,280,184 B2 10/2012 Chen et al.
8,406,559 B2 3/2013 Wu
(Continued)

FOREIGN PATENT DOCUMENTS

EP 3825955 A1 5/2021
KR 10-2016-0035192 A 3/2016
(Continued)

OTHER PUBLICATIONS

Kundu et al., No-Reference Quality Assessment of Tone-Mapped HDR Pictures, IEEE Transactions on Image Processing, vol. 26, No. 6, Jun. 2017 2957 (Year: 2017).*
(Continued)

*Primary Examiner* — Andrae S Allison
(74) *Attorney, Agent, or Firm* — Sughrue Mion, PLLC

(57) ABSTRACT

Provided are a display apparatus and a method thereof. The display apparatus includes a display; a memory storing one or more instructions; and a processor configured to execute the one or more instructions stored in the memory to: receive an input image, obtain luminance information from the input image, obtain, based on the luminance information, perceptual luminance information in view of a visual response, predict scene intensity information indicating a degree of a side effect that occurs after a first image quality processing is performed on the input image, and perform the first image quality processing on the input image based on the scene intensity information and the perceptual luminance information.

20 Claims, 21 Drawing Sheets

(51) Int. Cl.

| | |
|---|---|
| *G06T 5/50* | (2006.01) |
| *G06T 5/94* | (2024.01) |
| *G06V 10/56* | (2022.01) |
| *G06V 10/60* | (2022.01) |

(52) U.S. Cl.
CPC .............. *G06V 10/56* (2022.01); *G06V 10/60* (2022.01); *G06T 2207/10024* (2013.01); *G06T 2207/20081* (2013.01); *G06T 2207/20084* (2013.01); *G06T 2207/30168* (2013.01)

(58) Field of Classification Search
CPC . G06T 2207/20081; G06T 2207/20084; G06T 2207/30168; G06T 5/90; G06T 5/40; G06T 7/194; G06V 10/56; G06V 10/60; G06V 10/82; H04N 5/57
See application file for complete search history.

(56) References Cited

U.S. PATENT DOCUMENTS

| | | | |
|---|---|---|---|
| 9,135,865 | B2 | 9/2015 | Yang et al. |
| 9,390,482 | B2 | 7/2016 | Lee et al. |
| 10,963,676 | B2 * | 3/2021 | Wang ................... G06V 10/764 |
| 11,410,283 | B2 | 8/2022 | Jeong et al. |
| 11,481,586 | B2 | 10/2022 | Tai et al. |
| 2007/0230788 | A1 | 10/2007 | Lei |
| 2008/0170783 | A1 | 7/2008 | Yoo et al. |
| 2013/0083248 | A1 | 4/2013 | Suzuki |
| 2017/0116963 | A1 * | 4/2017 | Wanat .................. G09G 3/3406 |
| 2021/0073954 | A1 | 3/2021 | Mantiuk et al. |
| 2021/0150676 | A1 * | 5/2021 | Sytnik ....................... G06T 5/73 |
| 2021/0158077 | A1 * | 5/2021 | Tai ........................... G06T 3/40 |
| 2021/0166604 | A1 | 6/2021 | Lim et al. |
| 2023/0066869 | A1 * | 3/2023 | Kim .......................... G06T 5/90 |

FOREIGN PATENT DOCUMENTS

| | | | |
|---|---|---|---|
| KR | 10-2016-0140366 | A | 12/2016 |
| KR | 10-1767094 | B1 | 8/2017 |
| KR | 20190027131 | A * | 9/2017 |
| KR | 10-2019-0027131 | A | 3/2019 |
| KR | 10-2020-0031470 | A | 3/2020 |
| KR | 10-2021-0062477 | A | 5/2021 |
| WO | 2021/085679 | A1 | 5/2021 |

OTHER PUBLICATIONS

Jiang et al., Quantitative Measurement of Perceptual Attributes and Artifacts for Tone-Mapped HDR Display, IEEE Transactions on Instrumentation and Measurement, vol. 71, 2022 5014511 (Year: 2022).*

Yang et al., An Adaptive Method for Image Dynamic Range Adjustment, IEEE Transactions on Circuits and Systems for Video Technology, vol. 29, No. 3, Mar. 2019 (Year: 2019).*

Maragatham et al., "Contrast Enhancement by object based Histogram Equalization," 2011 World Congress on Information and Communication Technologies, pp. 1122-1126, Dec. 2011, Total 6 pages.

Sciencedirect, "Photoreceptors," From: Biomechatronics, 2019, Total 8 pages.

Communication dated Feb. 20, 2023, issued by the International Searching Authority in counterpart International Application No. PCT/KR2022/017793 (PCT/ISA/220, PCT/ISA/210, and PCT/ISA/237).

Björn Ottosson, "A perceptual color space for image processing", Dec. 23, 2020, 14 pages, https://bottosson.github.io/posts/oklab/.

European Extended Search Report issued Nov. 5, 2024 by the European Patent Office for EP Patent Application No. 22893284.4.

* cited by examiner

FIG. 1

IMAGE PROCESSING APPARATUS CAPABLE OF ENHANCING

CONTRAST-ENHANCED IMAGE $$Y = Y_R + Y_G + Y_B$$

$$Y_R = M_R(R) = Peak_W * \left(Rfactor * \left(\frac{R}{255}\right)^g\right)$$

$$Y_G = M_G(G) = Peak_W * \left(Gfactor * \left(\frac{G}{255}\right)^g\right)$$

$$Y_B = M_B(B) = Peak_W * \left(Bfactor * \left(\frac{B}{255}\right)^g\right)$$

$$Rfactor + Gfactor + Bfactor = 1$$

| Gain GT | Scene characteristic/constraints |
|---|---|
| 1.0 | High APL, blur area amount is big, no side effect |
| 0.6~0.8 | Middle APL, almost no side effect |
| ... | ... |
| 0.2~0.4 | Black detail/sensitive color in focus area |
| 0.0 | No blur area |

0.0

0.2

0.4

...

0.8

1.0

Gain GT:

FIG. 10

| Focus response (0~255) | Focus Level (0~N) |
|---|---|
| 0~25 | 1st focus level |
| 25~50 | 2nd focus level |
| ... | ... |
| 230~255 | 10th focus level |

Image
Perceptual
luminance

Perceptive
focus map
(Ground truth)

FOCUS RESPONSES
CORRESPONDING TO
RESPECTIVE PIXELS 0...255

FOCUS LEVELS
CORRESPONDING TO
RESPECTIVE PIXELS L1...L10

DISPLAY APPARATUS AND OPERATING METHOD THEREOF

CROSS-REFERENCE TO RELATED APPLICATIONS

This application is a by-pass continuation application of International Application No. PCT/KR/2022/017793, filed on Nov. 11, 2022, which based on and claims priority to Korean Patent Application No. 10-2021-0155161, filed on Nov. 11, 2021, in the Korean Intellectual Property Office, the disclosures of which are incorporated by reference herein in their entireties.

BACKGROUND

1. Field

The disclosure relates to a display apparatus and a method thereof. More particularly, the embodiments of the disclosure relate to a display apparatus capable of performing contrast enhancement on an image, and a method of the display apparatus.

2. Description of Related Art

Display apparatuses perform contrast enhancement to improve the contrast of an image. In the related art, global contrast enhancement methods and local contrast enhancement methods are used to improve the contrast of an image. In the global contrast enhancement methods, a global mapping function (corresponding to features of an entire image) is applied to each pixel of the image. However, such global mapping function may be inappropriate for various areas having different local contrast characteristics. A local contrast enhancement method includes dividing an image into a plurality of areas and analyzing information of each of the plurality of areas to apply a local contrast curve.

A sharpness-contrast enhancement method improves or sharpens detail textures and edges of an image. The detailed textures may be easily observed by the sharpness-contrast enhancement method.

An object-based contrast enhancement method identifies foreground objects and background pixels of an image, and includes different contrast enhancement approaches based on the characteristics of the foreground objects and the background pixels.

Because the global contrast enhancement methods mainly extend a luminance dynamic range, a high-luminance area may become brighter and a low-luminance area may become darker. However, certain portions of a medium-luminance area may be perceived to be smooth.

The sharpness-contrast enhancement method is mainly performed to increase locally detailed contrast visibility, and is applied only to a detailed area.

In the object-based contrast enhancement method, histogram equalization is individually applied with an average of each of the foreground and the background to separately improve the foreground and the background. Therefore, if the averages of the foreground and background are different from each other, a fracture may occur in the image.

Provided are a display apparatus capable of improving a depth contrast to enhance a perspective effect of an image, and an operating method of the display apparatus.

SUMMARY

According to an embodiment of the disclosure, a display apparatus includes: a display; a memory storing one or more instructions; and a processor configured to execute the one or more instructions stored in the memory to: receive an input image, obtain luminance information from the input image, obtain, based on the luminance information, perceptual luminance information in view of a visual response, predict scene intensity information indicating a degree of a side effect that occurs after a first image quality processing is performed on the input image, and perform the first image quality processing on the input image based on the scene intensity information and the perceptual luminance information.

According to an embodiment of the disclosure, a method of a display apparatus includes receiving an input image; obtaining luminance information from the input image; obtaining, based on the luminance information, perceptual luminance information in view of a visual response; predicting scene intensity information indicating a degree of a side effect that occur after a first image quality processing is performed on the input image; and performing the first image quality processing on the input image based on the scene intensity information and the perceptual luminance information.

According to an embodiment of the disclosure, a computer-readable recording medium having recorded thereon a program for performing a method of a display apparatus, which includes: receiving an input image; obtaining luminance information from the input image; obtaining, based on the luminance information and perceptual luminance information in view of a visual response; predicting scene intensity information indicating a degree of side effect that occurs after a first image quality processing is performed on the input image; and performing the first image quality processing on the input image based on the scene intensity information and the perceptual luminance information.

According to an embodiment of the disclosure, an image processing apparatus includes: a memory storing one or more instructions and including a scene intensity prediction module, a focus level map generation module, and a perspective enhancement module; and a processor configured to execute the one or more instructions to instruct: the scene intensity prediction module to receive pixels of an input image and generate scene intensity information, the focus level map generation module to receive pixels of an input image, receive the scene intensity information, generate a focus level map about the pixels of the input image at least based on the scene intensity information and the pixels of the input image, and the perspective enhancement module to receive the focus level map from the focus level map generation module and generate an output image. The focus level map includes normalized values of focus response values for the pixels of the input image, and the focus response values corresponds to the pixels and indicates degrees of sensitivity of human visual responses to the pixels of the input image.

An image processing apparatus according to an embodiment of the disclosure may process the image quality of an image with reference to perceptual luminance information, which indicates portions of the image that human eyes perceive as being important, and scene intensity information, which indicates a degree of occurrences of side effects after image quality processing is performed on the image, thereby increasing the effect of the image quality processing.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 is a diagram illustrating a display apparatus according to an embodiment of the disclosure;

FIG. 10 illustrates an example of configuring focus responses into 10 focus levels, according to an embodiment of the disclosure;

FIG. 21 is a block diagram illustrating a configuration of a display apparatus according to another embodiment of the disclosure.

DETAILED DESCRIPTION

Figure 2:
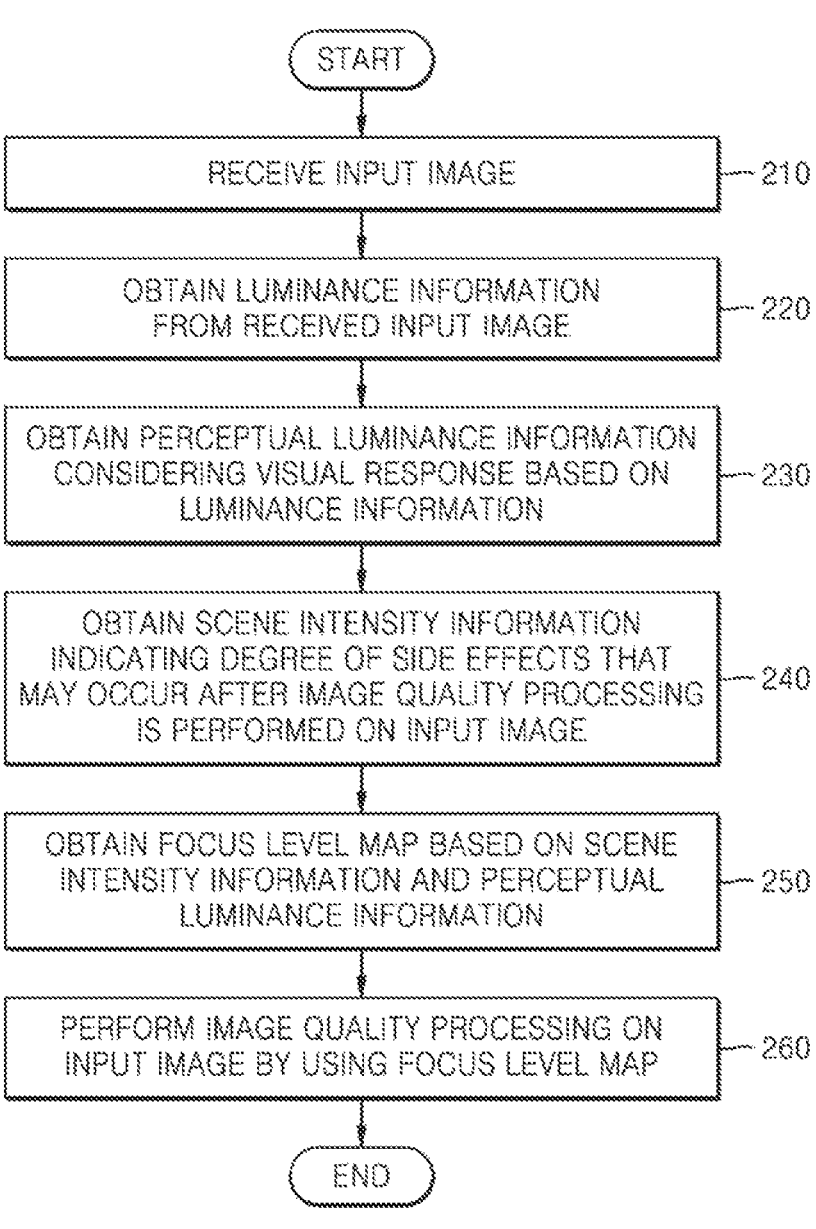
FIG. 2 is a flowchart illustrating operations of an image processing method performed by an image processing apparatus, according to an embodiment of the disclosure.

Throughout the disclosure, the expression "at least one of a, b, or c" indicates only a, only b, only c, both a and b, both a and c, both b and c, all of a, b, and c, or variations thereof. The terms used herein will be briefly described, and then the disclosure will be described in detail.

Although the terms used in the disclosure are selected from among common terms that are currently widely used in consideration of their functions in the disclosure, the terms may be different according to an intention of one of ordinary skill in the art, a precedent, or the advent of new technology. Also, in particular cases, the terms are discretionally selected by the applicant of the disclosure, in which case, the meaning of those terms will be described in detail in the corresponding part of the detailed description. Therefore, the terms used herein are not merely designations of the terms, but the terms are defined based on the meaning of the terms and content throughout the disclosure.

Throughout the specification, when a part "includes" a component, it means that the part may additionally include other components rather than excluding other components as long as there is no particular opposing recitation. Also, the terms described in the specification, such as " . . . er (or)", " . . . unit", " . . . module", etc., denote a unit that performs at least one function or operation, which may be implemented as hardware or software or a combination thereof.

Hereinafter, embodiments of the disclosure will be described in detail with reference to the accompanying drawings for one of skill in the art to be able to perform the disclosure without any difficulty. The disclosure may, however, be embodied in many different forms and should not be construed as being limited to the embodiments of the disclosure set forth herein. In order to clearly describe the disclosure, portions that are not relevant to the description of the disclosure are omitted, and similar reference numerals are assigned to similar elements throughout the specification.

In embodiments of the disclosure, the term "user" refers to a person who controls systems, functions, or operations, and may include a developer, an administrator, or an installer. In addition, in embodiments of the disclosure, the term 'image' or 'picture' may refer to a still image, a moving image consisting of a plurality of continuous still images (or frames), or a video.

Figure 1:
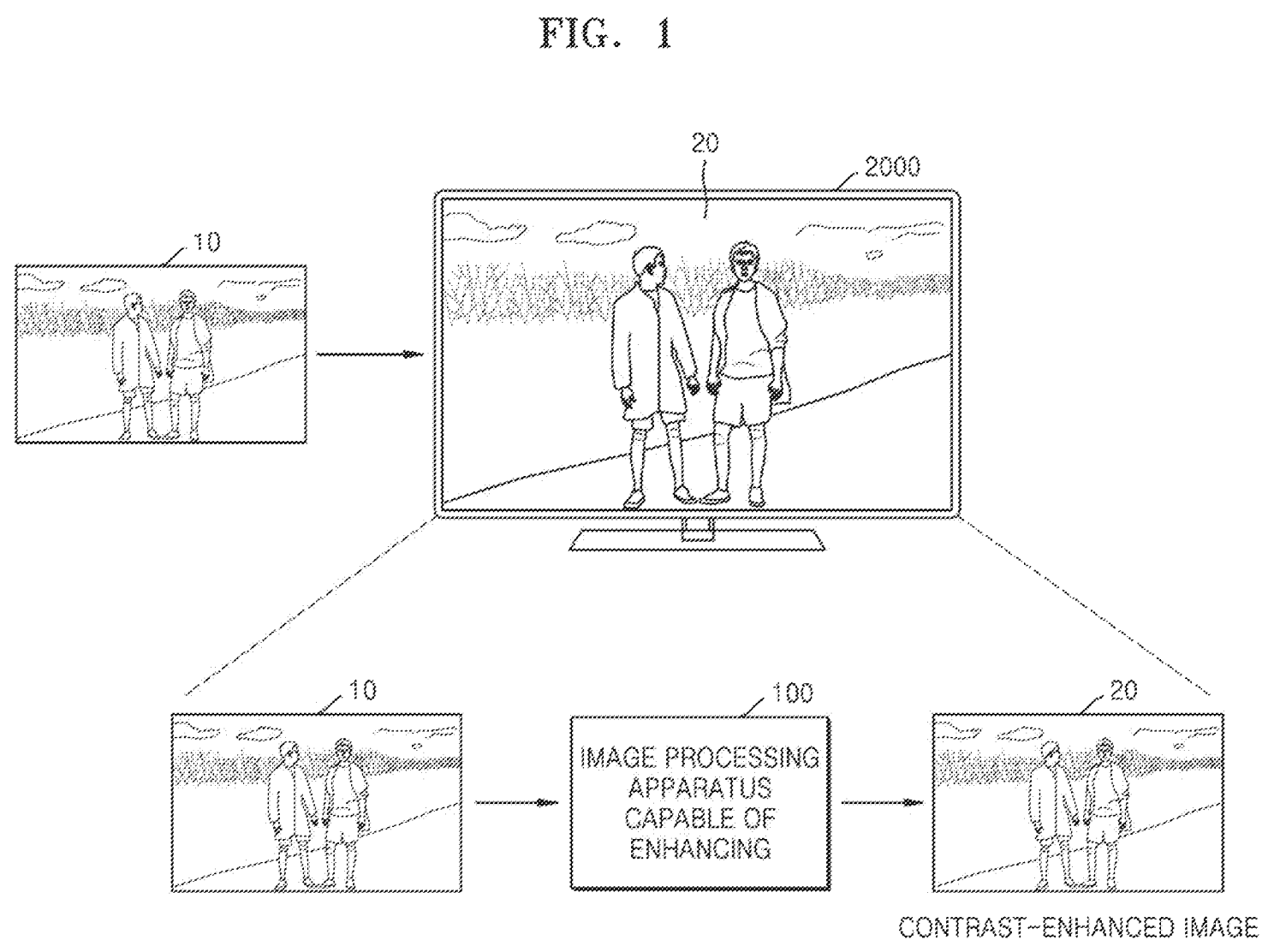

FIG. 1 is a diagram illustrating a display apparatus 2000 according to an embodiment of the disclosure.

Referring to FIG. 1, the display apparatus 2000 according to an embodiment of the disclosure may be an electronic device that receives an image, performs a process of improving the contrast of the received image, and displays the image-processed image. For example, the display apparatus 2000 may be implemented in various forms such as a television (TV), a mobile phone, a tablet personal computer (PC), a digital camera, a camcorder, a laptop computer, a desktop computer, an electronic book terminal, a digital broadcast terminal, a personal digital assistant (PDA), a portable multimedia player (PMP), a navigation system, an MP3 player, a smart phone, a wearable device, etc.

Alternatively or in addition, the display apparatus 2000 may include a display to display a contrast-enhanced image. Also, the display apparatus 2000 may be a stationary electronic device arranged at a fixed position, may be a mobile electronic device having a portable form, or may be a digital broadcast receiver capable of receiving a digital broadcast signal. In particular, embodiments of the disclosure may be easily implemented in an image processing apparatus having a large display, such as a TV, but are not limited thereto.

The display apparatus 2000 according to an embodiment of the disclosure may perform a process of improving the contrast of an image 10 received or input from an external device or an external server by using an image processing apparatus 100 capable of enhancing the perspective effect and contrast of an image, and may display a contrast-enhanced image 20 on the display. For example, the image processing apparatus 100 is implemented by the processor 2020 and the memory 2010 in FIG. 21.

The image processing apparatus 100 according to an embodiment of the disclosure may receive an input image, obtain luminance information from the received input image, obtain perceptual luminance information based on the luminance information, predict scene intensity information indicating a degree of side effects that may occur after image quality processing is performed on the input image, and perform the image quality processing on the input image based on the scene intensity information and the perceptual luminance information.

The image processing apparatus 100 according to an embodiment of the disclosure may obtain a focus level map based on the scene intensity information and the perceptual luminance information, and perform the image quality processing on the input image by using the focus level map.

According to an embodiment of the disclosure, the image processing apparatus 100 may obtain, from the received input image, the luminance information based on characteristic information of the display.

According to an embodiment of the disclosure, the image processing apparatus 100 may obtain the perceptual luminance information from the luminance information by using a human visual system (HVS) model.

According to an embodiment of the disclosure, the image processing apparatus 100 may extract a feature from the input image, and obtain the scene intensity information of the input image from the input image by using a neural network. Based on training images, the neural network is trained to output scene intensity information indicating intensity of a side effect that may occur after image quality processing is performed on the training images.

According to an embodiment of the disclosure, the image processing apparatus 100 may obtain the focus level map by applying a weight to the perceptual luminance information by using the scene intensity information.

According to an embodiment of the disclosure, the image processing apparatus 100 may obtain a first focus level map by filtering the perceptual luminance information by using a predetermined filter, obtain a second focus level map by applying a weight to the first focus level map by using the scene intensity information, and obtain the focus level map by normalizing the second focus level map. The predetermined filter may include at least one of a Laplacian filter, a gradient filter, a variance filter, or a wavelet filter.

According to an embodiment of the disclosure, the image processing apparatus 100 may perform the image quality processing by performing at least one of luminance contrast enhancement, color contrast enhancement, or detail enhancement on the input image by using the focus level map.

According to an embodiment of the disclosure, the image processing apparatus 100 may obtain a global contrast-enhanced image by applying, to the input image, a global tone mapping curve, which is obtained by adjusting dominant luminances of "N" (2, 3, 4, . . . ) focus levels of the focus level map by using different gains, obtain a local contrast-enhanced image by applying, to the input image, N different tone mapping curves corresponding to respective areas corresponding to the N focus levels of the focus level map, and obtain an output image by mixing the global contrast-enhanced image with the local contrast-enhanced image.

According to an embodiment of the disclosure, the image processing apparatus 100 may obtain a hue-based enhanced image by applying color enhancement gains to dominant hue values corresponding to the N focus levels of the focus level map, obtain a saturation-based enhanced image by applying saturation enhancement gains to dominant saturation values corresponding to the N focus levels of the focus level map, and obtain an output image by mixing the hue-based enhanced image with the saturation-based enhanced image.

According to an embodiment of the disclosure, the image processing apparatus 100 may obtain an output image by applying detail enhancement gains to focus level areas of the focus level map, respectively.

Hereinafter, detailed descriptions will be provided with reference to the drawings.

FIG. 2 is a flowchart illustrating operations of an image processing method performed by the image processing apparatus 100, according to an embodiment of the disclosure. The image processing apparatus 100 may be included in the display apparatus 2000 as illustrated in FIG. 1 or may be included in another electronic device, to perform image processing.

Referring to FIG. 2, in operation 210, the image processing apparatus 100 may receive an input image. The image processing apparatus 100 may obtain the input image from an internal memory or receive the input image from an external device. The image processing apparatus 100 may perform image processing on the input image, for example, in units of frames.

In operation 220, the image processing apparatus 100 may obtain luminance information from the received input image.

According to an embodiment of the disclosure, the image processing apparatus 100 may obtain the luminance information of the obtained or received image, based on characteristic information of the display. Display-based luminance information may be represented by a histogram, a lookup table (LUT), or an equation, etc.

In operation 230, the image processing apparatus 100 may obtain perceptual luminance information in view of a visual response based on the luminance information. According to an embodiment of the disclosure, the image processing apparatus 100 may obtain the perceptual luminance information from the display characteristic-based luminance information by using an HVS model.

In operation 240, the image processing apparatus 100 may obtain scene intensity information indicating a degree of a side effect or side effects that (may) occur(s) after image quality processing is performed on the input image.

According to an embodiment of the disclosure, the image processing apparatus 100 may extract a feature from the input image, and obtain the scene intensity information of the input image from the input image by using a neural network. Based on training images, the neural network is trained to output scene intensity information indicating intensity of a side effect that may occur after image quality processing is performed on the training images.

In operation 250, the image processing apparatus 100 may obtain a focus level map based on the scene intensity information and the perceptual luminance information.

According to an embodiment of the disclosure, the image processing apparatus 100 may obtain the focus level map by applying a weight to the perceptual luminance information by using the scene intensity information.

According to an embodiment of the disclosure, the image processing apparatus 100 may obtain a first focus level map by filtering the perceptual luminance information by using a predetermined filter, obtain a second focus level map by applying a weight to the first focus level map by using the scene intensity information, and obtain the focus level map by normalizing the second focus level map. Here, the predetermined filter may include at least one of a Laplacian filter, a gradient filter, a variance filter, or a wavelet filter.

In operation 260, the image processing apparatus 100 may perform image quality processing on the input image by using the focus level map.

According to an embodiment of the disclosure, the image processing apparatus 100 may perform the image quality processing by performing at least one of luminance contrast enhancement, color contrast enhancement, or detail enhancement on the input image by using the focus level map.

According to an embodiment of the disclosure, the image processing apparatus 100 may obtain a global contrast-enhanced image by applying, to the input image, a global tone mapping curve, which is obtained by adjusting dominant luminances of N focus levels of the focus level map by using different gains, obtain a local contrast-enhanced image by applying, to the input image, N different tone mapping curves corresponding to respective areas corresponding to the N focus levels of the focus level map, and obtain an output image by mixing the global contrast-enhanced image with the local contrast-enhanced image.

According to an embodiment of the disclosure, the image processing apparatus 100 may obtain a hue-based enhanced image by applying color enhancement gains to dominant hue values corresponding to the N focus levels of the focus level map, obtain a saturation-based enhanced image by applying saturation enhancement gains to dominant saturation values corresponding to the N focus levels of the focus level map, and obtain an output image by mixing the hue-based enhanced image with the saturation-based enhanced image.

According to an embodiment of the disclosure, the image processing apparatus 100 may obtain an output image by applying detail enhancement gains to focus level areas of the focus level map, respectively.

Figure 3:
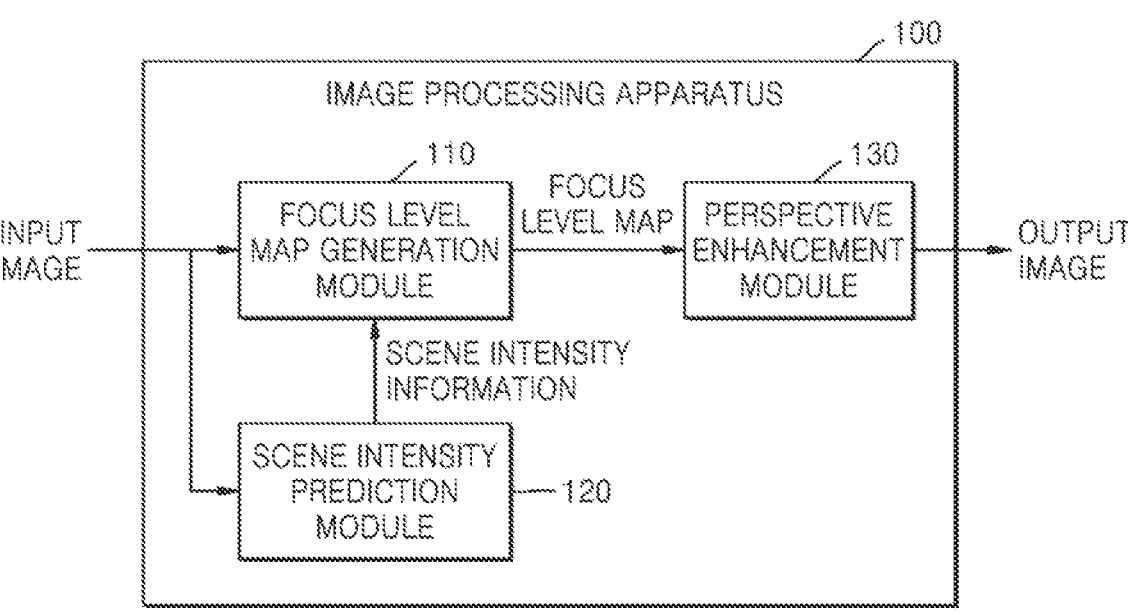
FIG. 3 illustrates an example of an image processing apparatus according to an embodiment of the disclosure.

FIG. 3 illustrates an example of the image processing apparatus 100 according to an embodiment of the disclosure.

Figure 21:
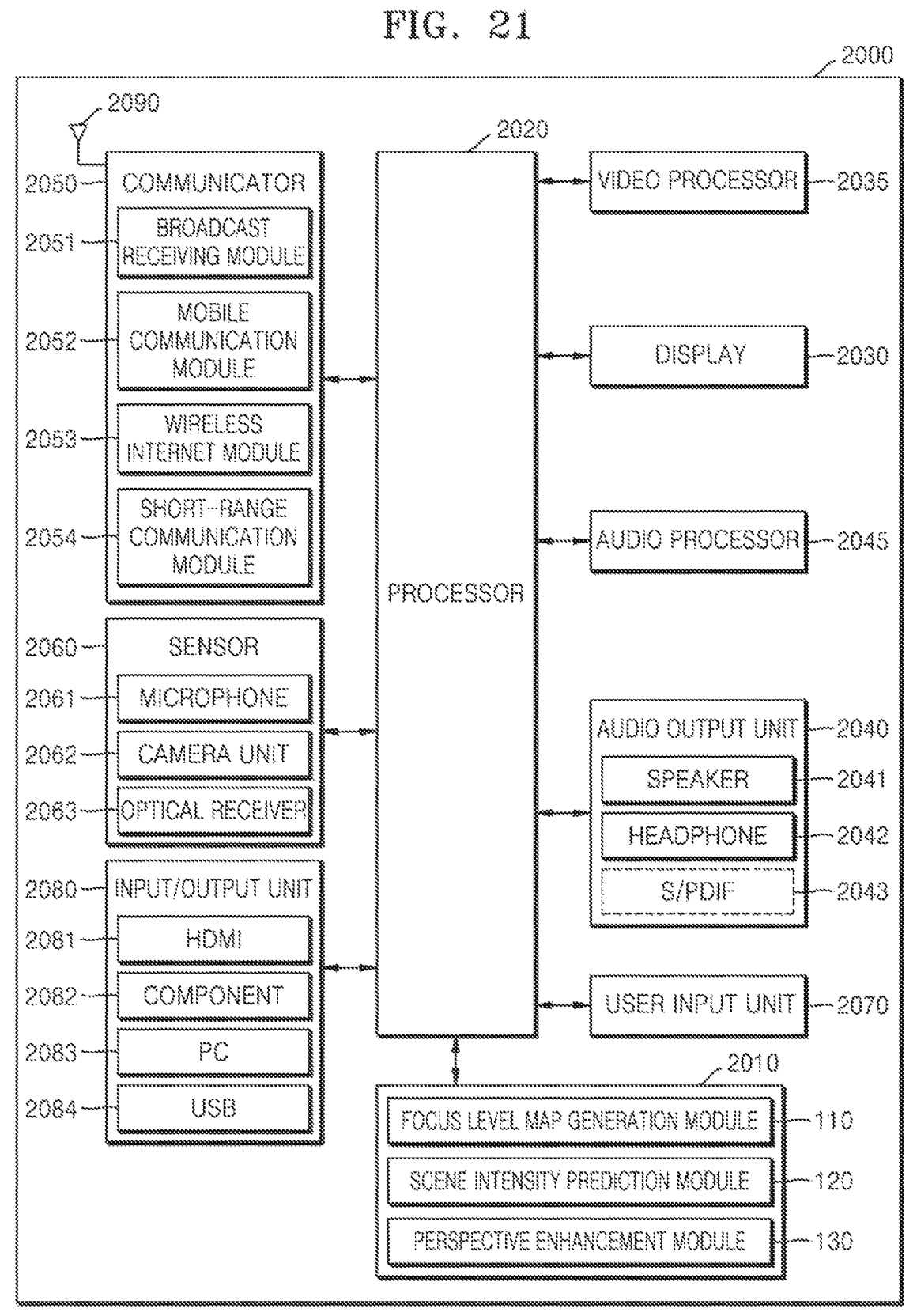

Referring to FIG. 3, the image processing apparatus 100 may include a focus level map generation module 110, a scene intensity prediction module 120, and a perspective enhancement module 130. For example, all these elements may be implemented in a memory connected with a processor, as illustrated in FIG. 21.

The focus level map generation module 110 may include appropriate logics, circuits, interfaces, and/or code operable to receive an input image and measure a focus response of each pixel included in the input image. A pixel-based focus response map may include a focus level map with N levels obtained by normalizing focus response values. The number of levels may be variously determined, and N is set to 10 in examples described below. A focus response value corresponding to each pixel may indicate the degree of sensitivity of a human visual response to the pixel.

The focus level map generation module 110 may include appropriate logics, circuits, interfaces, and/or code operable to obtain a pixel-based focus level map based on perceptual luminance information for each pixel of the image and scene intensity information received from the scene intensity prediction module 120.

The scene intensity prediction module 120 may include appropriate logics, circuits, interfaces, and/or code operable to estimate a scene-adaptive enhancement gain based on scene intensity information. Side effects that may occur after image quality processing is performed may be different according to the type of a scene of the image. For example, in the case of a scene having a large number of blur areas, a side effect may rarely occur due to image quality enhancement. However, in the case of a scene having a pattern, many side effects may occur due to image quality enhancement, and thus, it may be preferable that the image quality enhancement is not performed. Therefore, image quality processing may be required for some scenes of certain categories, but may not be required for some other scenes. Accordingly, in an embodiment of the disclosure, scene intensity information indicating to what extent such image quality processing is required may be predicted, and the scene intensity information may be used to perform more scene-adaptive image quality processing.

The perspective enhancement module 130 may enhance the contrast of the image by using a focus level map received from the focus level map generation module 110, and may enhance a luminance contrast, a color contrast, and a detail contrast.

Figure 4:
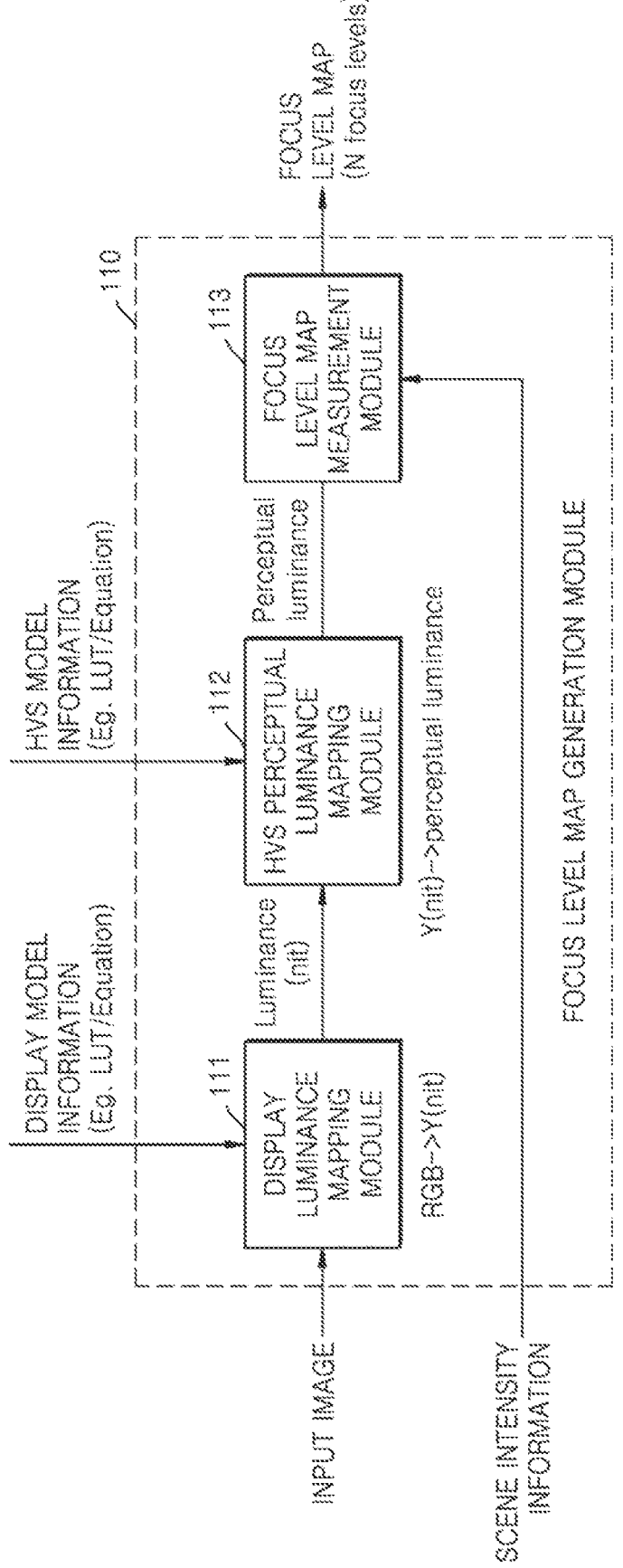
FIG. 4 illustrates an example of a focus level map generation module according to an embodiment of the disclosure.

FIG. 4 illustrates an example of the focus level map generation module 110 according to an embodiment of the disclosure.

In the disclosure, a focus level map indicates areas that a human may perceive as being important. The term 'focus level map' may also be referred to as 'perceptive focus level map'.

Referring to FIG. 4, the focus level map generation module 110 may include a display luminance mapping module 111 configured to map an RGB value of an input image to a display luminance value, an HVS perceptual luminance mapping module 112 configured to map a display luminance value to a perceptual luminance value by using an HVS model, and a focus level map measurement module 113 configured to measure perceptual luminance values into a focus level map.

The display luminance mapping module 111 may output a display luminance value corresponding to each pixel of an input image by mapping an RGB value of the input image to a display luminance value based on a display luminance model.

The luminance (nit) levels may be different for each display. Accordingly, a result of mapping an RGB code value of an input image to a display luminance value may vary depending on display characteristics. The display luminance model may be represented by a predetermined LUT, an equation, or a curve.

Figure 5:
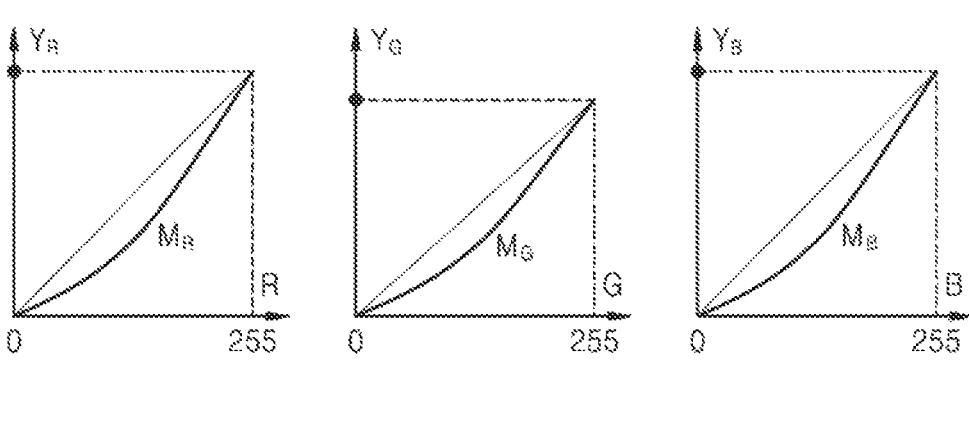
FIG. 5 is a reference diagram for describing an example of mapping an RGB value of an input image to a display luminance value, according to an embodiment of the disclosure.

FIG. 5 is a reference diagram for describing an example of mapping an RGB value of an input image to a display luminance value, according to an embodiment of the disclosure.

Referring to FIG. 5, an R channel code value of the input image is mapped to $Y_R$ according to $M_R$, a G channel code value of the input image is mapped to $Y_G$ according to $M_G$, and a B channel code value of the input image is mapped to $Y_B$ according to $M_B$. Y may be obtained according to the following Equation (1).

$$Y = Y_R + Y_G + Y_B \qquad \text{Equation (1)}$$

9

-continued $$Y_R = M_R(R) = \text{Peak}_W * \left( Rfactor - \left( \frac{R}{255} \right)^R \right)$$

$$Y_G = M_G(G) = \text{Peak}_W * \left( Gfactor - \left( \frac{G}{255} \right)^G \right)$$

$$Y_B = M_B(B) = \text{Peak}_W * \left( Bfactor - \left( \frac{B}{255} \right)^B \right)$$

$$Rfactor + Gfactor + Bfactor = 1$$

Here, $\text{Peak}_W$ denotes a peak white value of a panel.

Rfactor, Gfactor, and Bfactor are fixed values according to a standard matrix, and for example, in the case of a panel with an sRGB color space, in an sRGB-to-XYZ standardized 3×3 matrix, Rfactor, Gfactor, Bfactor=0.2126, 0.7152, 0.0722.

Rfactor, Gfactor, and Bfactor may be calculated or determined from measured data. For example, they may be the ratios of the R/G/B channel peaks to the entire peak.

$\text{Peak}_R$, $\text{Peak}_G$, and $\text{Peck}_B$ denote peak-measured luminance values of the R/G/B channels.

$$Rfactor = \text{Peak}_R / \text{Peak}$$

$$Gfactor = \text{Peak}_G / \text{Peak},$$

$$Bfactor = \text{Peak}_B / \text{Peak},$$

$$\text{Peak} = \text{Peak}_R + \text{Peak}_G + \text{Peak}_B$$

g denotes the exponent gain of a power function. For example, it may be 1.0, 2.2, or 2.4 in different panels.

Referring back to FIG. 4, the display luminance mapping module 111 may output, to the HVS perceptual luminance mapping module 112, display luminance values corresponding to the input image.

The HVS perceptual luminance mapping module 112 may map the display luminance values to perceptual luminance values by using an HVS model and output the result.

The HVS model represents an actual human visual response to a luminance under certain conditions. By the HVS model, a luminance value Y(nit) is mapped to a perceptual luminance value. The HVS model may be represented by a predetermined LUT, an equation, or a curve.

Figure 6:
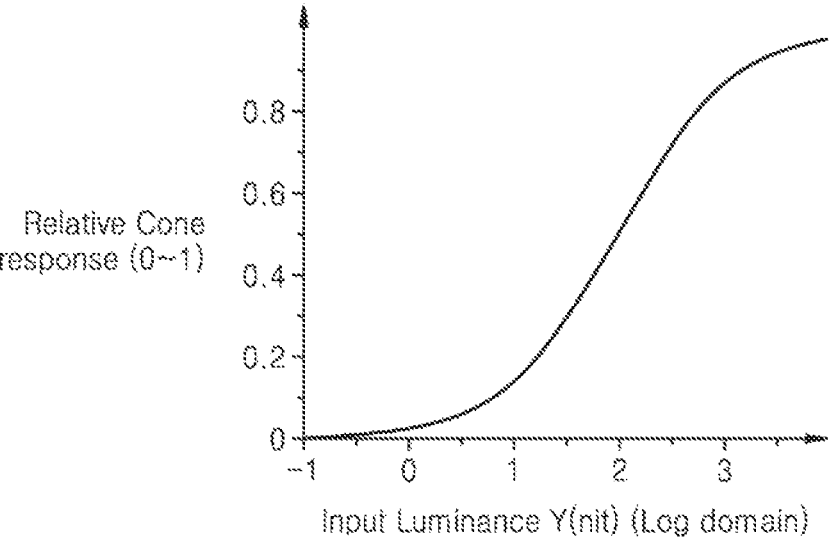
FIG. 6 illustrates an example of cone cell responses corresponding to input luminances, according to an embodiment of the disclosure.

FIG. 6 illustrates an example of cone cell responses corresponding to input luminances, according to an embodiment of the disclosure.

In the HVS model, a response function of a cone cell may be represented by the following Naka-Rushton equation.

$$\frac{V}{V_{max}} = \frac{L^n}{L^n + \sigma^n}$$

Here, $$\frac{v}{v_{max}}$$

denotes a cone cell response, L denotes an input luminance in Here, a log domain, $\sigma$ denotes a semi-saturation coefficient, and the exponent n denotes the steepness of the slope.

Referring to FIG. 6, display luminance values (represented by the horizontal axis) corresponding to an input image received from the display luminance mapping module 111 are mapped to relative cone cell response values (represented by the vertical axis). The relative cone cell response values are indicated as being within the range of 0 to 1.

Referring back to FIG. 4, the HVS perceptual luminance mapping module 112 may output, to the focus level map measurement module 113, the perceptual luminance value mapped to the display luminance values by using the HVS model.

The focus level map measurement module 113 may obtain a focus level map based on the perceptual luminance values received from the HVS perceptual luminance mapping module 112, and scene intensity information received from the scene intensity prediction module 120.

First, a method, performed by the scene intensity prediction module 120, of outputting scene intensity information will be described with reference to FIGS. 7 and 8.

Figure 7:
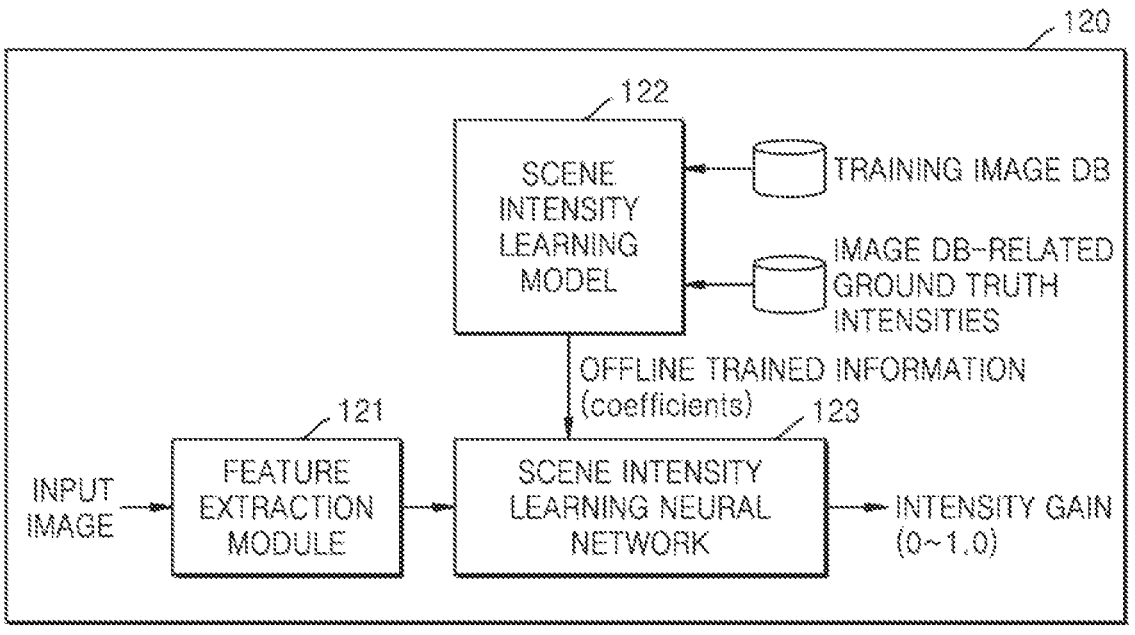
FIG. 7 illustrates an example of a scene intensity prediction module according to an embodiment of the disclosure.

FIG. 7 illustrates an example of the scene intensity prediction module 120 according to an embodiment of the disclosure.

Some scenes of an image may be inappropriate for contrast enhancement due to side effects, such as a black detail disappearing or pattern distortion. In order to prevent such side effects, scene intensity information (e.g., a category or a gain of a scene) may be obtained by the scene intensity prediction module 120. Such scene intensity information may be predicted by using a rule-based algorithm (e.g., constraints limitation) or a neural network. FIG. 7 illustrates an example of predicting the scene intensity information by using a neural network.

Referring to FIG. 7, the scene intensity prediction module 120 may include a feature extraction module 121, a scene intensity learning model 122, and a scene intensity learning neural network 123.

The feature extraction module 121 may extract features from an input image. The features of the input image may include global features, local features, custom features, etc. The global features may include a global average picture level (APL) indicating an average luminance value of pixels of an image, saturation, standard division, etc. The local features may include a block-based perceptual histogram, a gradient, a variance, a color, etc. The custom features may include block detail information or other side effect-related information.

The scene intensity learning model 122 may be a neural network model configured to learn to output intensity information from an input image, based on training images and gains designated by a user. The neural network model may be a neural network, e.g., linear regression-based neural network, a multi-layer perceptron (MLP), a convolutional neural network (CNN), etc.

Figure 8:
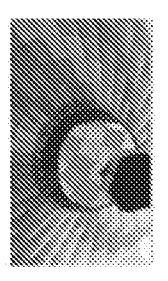
FIG. 8 illustrates an example of scene intensities (gains) designated by a user, according to an embodiment of the disclosure.
Figure 8:
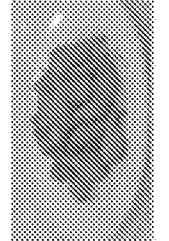
Figure 8:
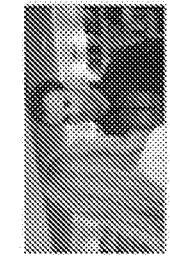
Figure 8:
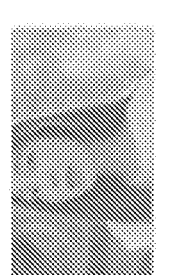
Figure 8:
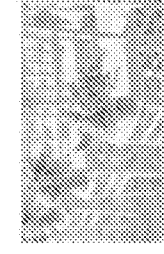

FIG. 8 illustrates an example of the gains (scene intensities) designated by a user, according to an embodiment of the disclosure. Scene intensities corresponding to scenes may be classified into a plurality of categories.

Referring to FIG. 8, scene intensities may be divided into, for example, five categories. The scene intensity of a scene in which the amount of blur areas is large and there are no side effects occurring after image quality enhancement, e.g., a scene having a high APL, may be set to 1.0, the scene intensity of a scene in which there are only a few side effects occurring after image quality enhancement, e.g., a scene having a middle APL, may be set to 0.6 to 0.8, the scene intensity of a scene in which there are a number of side effects occurring after image quality enhancement, e.g., a scene having a black detail and a sensitive color in a focus area, may be set to 0.2 to 0.4, and the scene intensity of a scene for which image quality enhancement is inappropriate, e.g., a pattern image, may be set to 0.0.

FIG. 8 illustrates that scene intensity information is classified into five categories, but this is merely an example. The categories into which intensities of scenes are classified may be variously determined according to a learning model.

The scene intensity learning model 122 may be trained to predict a scene intensity from an input image by receiving a plurality of training images and tags indicating scene intensities set for respective training images, and learning the training images.

The scene intensity learning model 122 is for obtaining parameter information configured in the scene intensity learning neural network 123, and may be provided in the display apparatus 2000 or may be provided external to the display apparatus 2000. The parameters (e.g., weights and coefficients) included in the scene intensity learning neural network 123 may be determined by training the scene intensity learning model 122 based on training data set.

The scene intensity learning model 122 may be a deep neural network (DNN) including a plurality of layers, and in order for the neural network to accurately output resulting data corresponding to input data, the neural network needs to be trained. Here, 'training' a neural network may mean that the neural network may discover or learn on its own method of analyzing various pieces of data input to the neural network, a method of classifying the input pieces of data, and/or a method of extracting, from the input pieces of data, features necessary for generating resulting data. In detail, through a training process, a neural network may learn training data to optimize and set the parameters (e.g., weights and coefficients) in the neural network. A neural network configured with optimized parameters may output an intended result by learning input data by itself.

The scene intensity learning model 122 according to an embodiment of the disclosure may be a neural network model trained to output scene intensity information corresponding to an input image, by receiving and learning feature information of a plurality of training images (or areas) and tags including scene intensity information defined by the user to correspond to the respective training images. Here, the scene intensity information may have the same form as the example illustrated in FIG. 8.

For example, the scene intensity learning model 122 may receive first training feature information corresponding to a first training image, and scene intensity information corresponding to the first training image, and determine parameter information by updating the parameters included in the scene intensity learning model 122 such that a difference between output data and the scene intensity information is minimized.

The parameters (e.g., weights, and coefficients) obtained by the training of the scene intensity learning model 122 may be delivered to the scene intensity learning neural network 123, which may output scene intensity information corresponding to an input image upon reception of the input image.

Referring back to FIG. 4, the focus level map may be output by the focus level map measurement module 113 based on the scene intensity information obtained by the scene intensity learning neural network 123 and the perceptual luminance values obtained by the HVS perceptual luminance mapping module 112. The focus level map measurement module 113 may output the focus level map by using a rule-based algorithm or a trained neural network.

Figure 9:
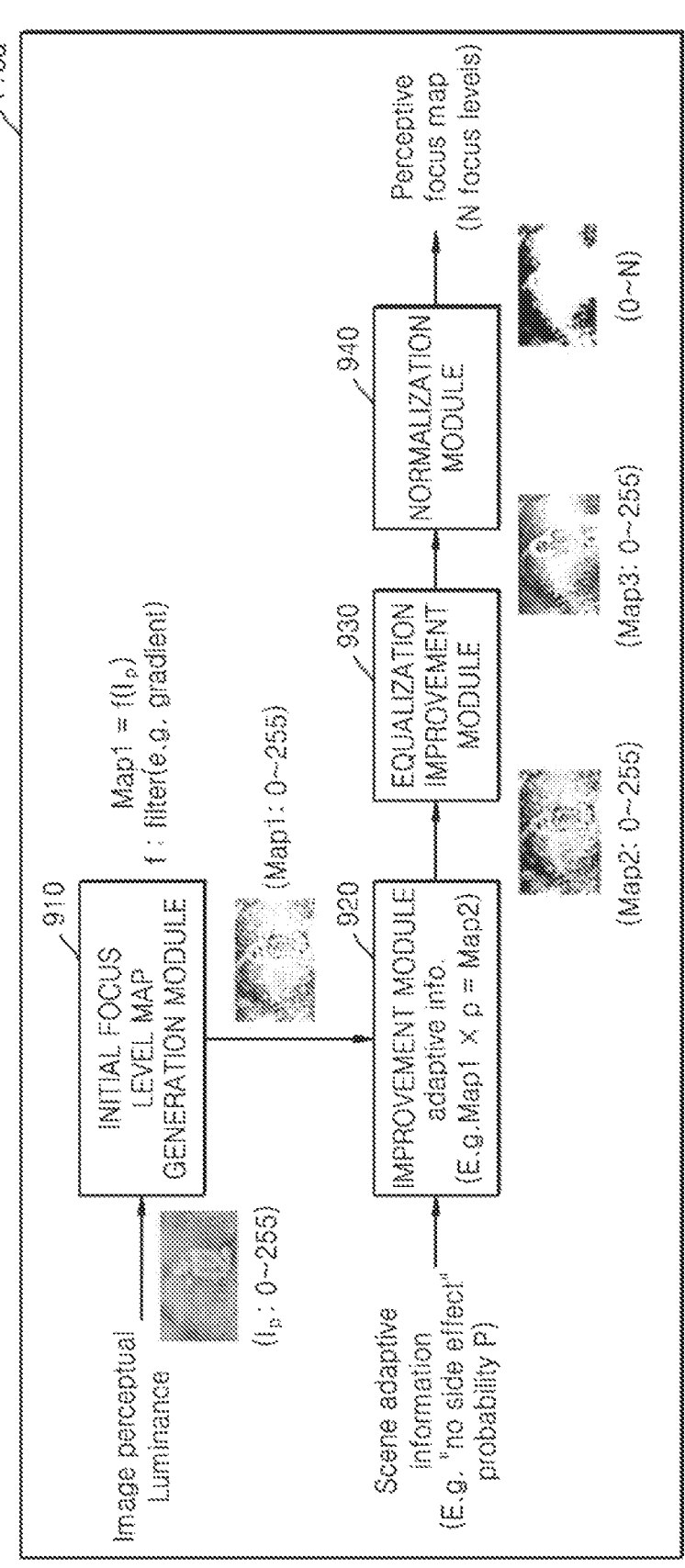
FIG. 9 illustrates an example of generating a focus level map according to a rule-based algorithm, according to an embodiment of the disclosure.

FIG. 9 illustrates an example of generating a focus level map according to a rule-based algorithm, according to an embodiment of the disclosure.

Referring to FIG. 9, a focus level map measurement module 113*a* according to an embodiment of the disclosure may include an initial focus level map generation module 910, an improvement module 920, an equalization improvement module 930, and a normalization module 940.

The initial focus level map generation module 910 may receive perceptual luminance values of an image and generate an initial focus level map "Map 1" by using a filter. The filter used to generate the initial focus level map may be a Laplacian filter, a gradient filter, a variance filter, a wavelet filter, or the like. The initial focus level map generation module 910 may use the filter to determine a focus response of a certain pixel by using information of a center pixel and neighbor pixels within a certain window size.

The improvement module 920 may receive an initial focus level map output from the initial focus level map generation module 910 and scene intensity information, and apply a weight to the initial focus level map by using the scene intensity information. For example, the improvement module 920 may obtain "Map 2" by multiplying the initial focus level map "Map 1" by scene intensity information p.

The equalization improvement module 930 may receive "Map 2" output from the improvement module 920, and obtain "Map 3" by performing equalization improvement on "Map 2" by using, for example, a median filter.

The normalization module 940 may receive and normalize "Map 3" output from the equalization improvement module 930 to generate a final perceptive focus level map. The normalization module 940 may map each of focus response values (0 to 255) corresponding to respective pixels of "Map 3," to one of N predetermined focus levels. After such a normalization process is performed, the focus level value of an in-focus pixel may be high, and the focus level value of a blur pixel may be low.

FIG. 10 illustrates an example of configuring focus responses into 10 focus levels, according to an embodiment of the disclosure.

The normalization module 940 may classify focus response values corresponding to respective pixels of an image into, for example, 10 levels. FIG. 10 illustrate a table showing a relationship between each focus response and a focus level.

When each of focus response values corresponding to respective pixels of an image is between 0 and 255, and the number of focus levels is 10, the focus response values between 0 and 25 may correspond to a first focus level, the focus response values between 26 and 50 may correspond to a second focus level, and the focus response values between 230 and 255 may correspond to a tenth focus level. However, the relationships between the focus responses and the focus levels illustrated in FIG. 10 are merely examples, the number of focus levels may be variously determined, and the relationships between the focus response ranges and the corresponding focus levels may also be variously determined.

Figure 11:
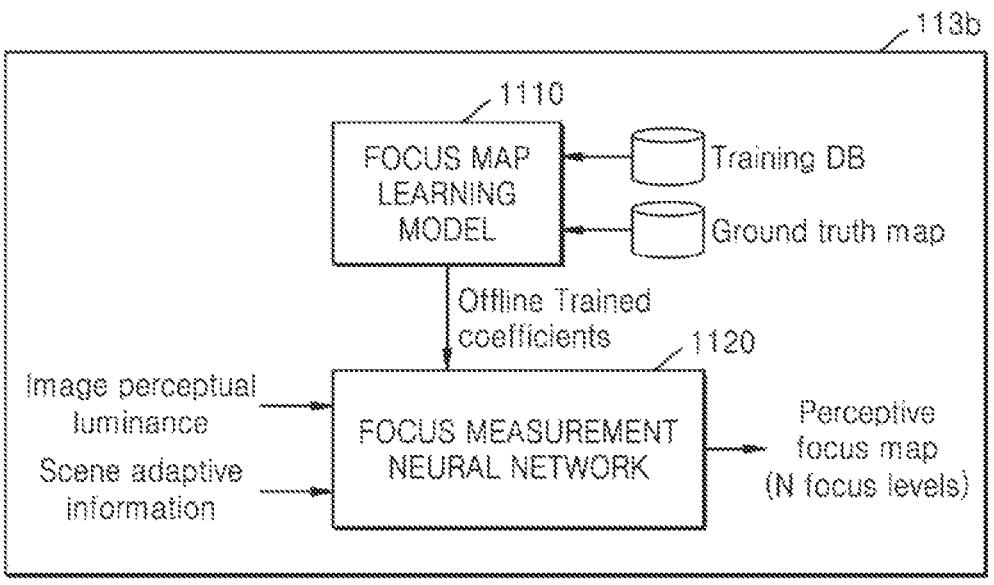
FIG. 11 illustrates an example of generating a focus level map according to a neural network, according to an embodiment of the disclosure.

FIG. 11 illustrates an example of generating a focus level map according to a neural network, according to an embodiment of the disclosure.

Referring to FIG. 11, a focus level map measurement module 113*b* according to an embodiment of the disclosure may include a focus level map learning model 1110 and a focus measurement neural network 1120.

The focus level map learning model 1110 may be a neural network model trained to output a perceptive focus level map from an input image, by learning training images using a focus level map designated by a user. Weight values used in the focus measurement neural network 1120 may be obtained by the learning model, and the obtained weight values may be output to the focus measurement neural network 1120. The neural network model may be a neural network such as an MLP, a CNN, or the like.

Figure 12:
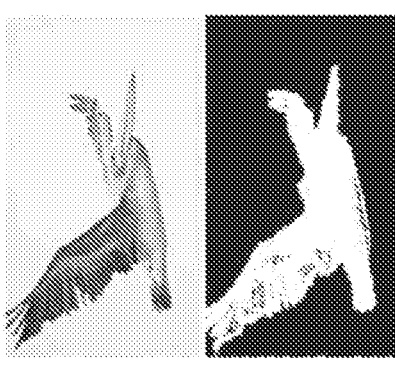
FIG. 12 illustrates an example of a perceptive focus level map designated by a user, according to an embodiment of the disclosure.
Figure 12:
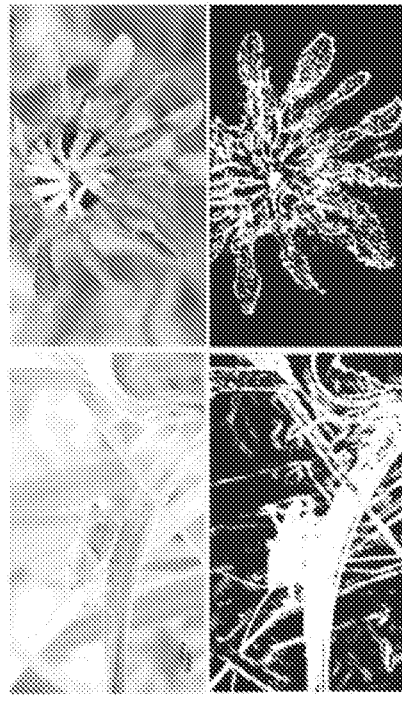

FIG. 12 illustrates an example of a perceptive focus level map designated by a user, according to an embodiment of the disclosure.

The focus level map learning model 1110 may be trained to predict a perceptive focus level map from perceptual luminance values of an input image, by receiving perceptual luminance values of a plurality of training images and focus level maps designated to the respective training images, and learning the training images.

The focus level map learning model 1110 is configured for obtaining parameter information configured in the focus measurement neural network 1120, and may be provided in the display apparatus 2000 or may be provided external to the display apparatus 2000. The parameters (e.g., weights and coefficients) included in the focus measurement neural network 1120 may be determined by training the focus level map learning model 1110 based on training data set.

The focus level map learning model 1110 may be a DNN including a plurality of layers, and in order for the neural network to accurately output resulting data corresponding to input data, the neural network needs to be trained according to the purpose. Here, 'training' a neural network may mean that the neural network may discover or learn on its own method of analyzing various pieces of data input to the neural network, a method of classifying the input pieces of data, and/or a method of extracting, from the input pieces of data, features necessary for generating resulting data. In detail, through a training process, a neural network may learn training data to optimize and set the parameters (e.g., weights and coefficients) in the neural network. A neural network configured with optimized parameters may output an intended result by learning input data by itself.

The focus level map learning model 1110 according to an embodiment of the disclosure may be a neural network model trained to output a focus level map corresponding to an input image, by receiving feature information of a plurality of training images (or areas) and tags including scene intensity information corresponding to the training images, and focus level maps defined by a user and corresponding to the respective training images, and learning the received information. Here, the focus level maps may have the same form as the example illustrated in FIG. 12.

For example, the focus level map learning model 1110 may receive first training feature information corresponding to a first training image, and a focus level map corresponding to the first training image, and determine parameter information by updating the parameters included in the focus level map learning model 1110 such that a difference between output data and the focus level map is minimized.

Parameters (e.g., weights and coefficients) obtained by training the focus level map learning model 1110 may be transmitted to the focus measurement neural network 1120, and the focus measurement neural network 1120 may output, upon reception of an input image and scene intensity information, a focus level map corresponding to the input image.

Figure 13:
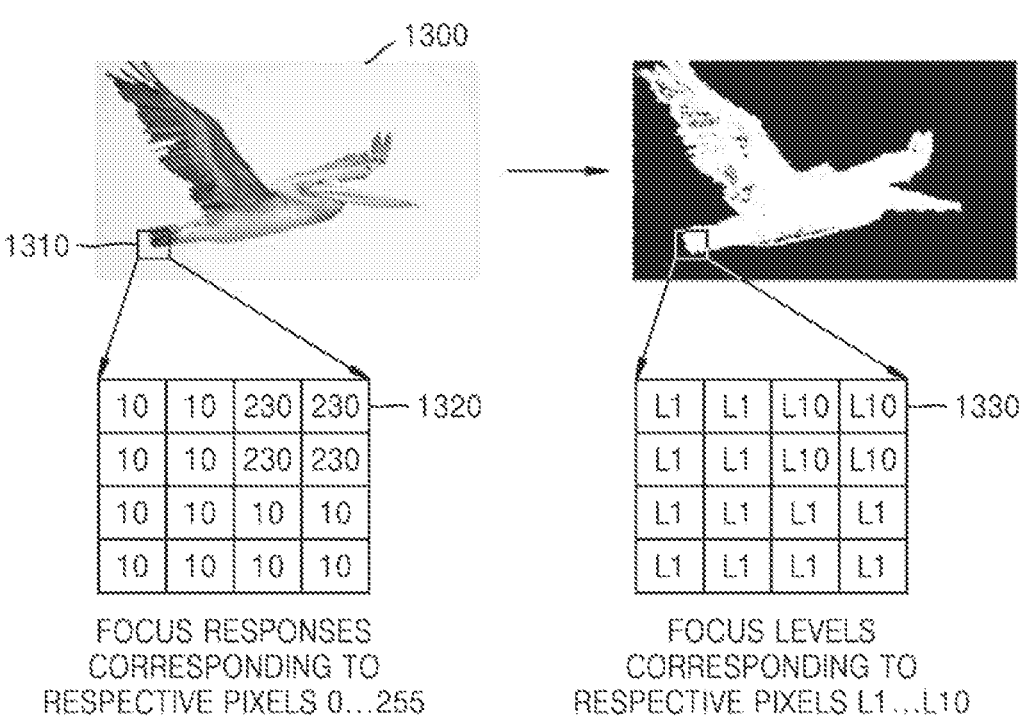
FIG. 13 is a reference diagram for describing a relationship between a focus response and a focus level corresponding to each pixel of an input image, according to an embodiment of the disclosure.

FIG. 13 is a reference diagram for describing a relationship between a focus response and a focus level corresponding to each pixel of an input image, according to an embodiment of the disclosure.

Referring to FIG. 13, when focus response values 1320 corresponding to respective pixels included in a portion 1310 of an input image 1300 are 10, 10, 230, 230, 10, 10, 230, 230, 10, 10, 10, 10, 10, 10, 10, and 10, and they are classified into 10 focus levels as illustrated in FIG. 10, focus levels 1330 corresponding to the respective pixels may be output as L1, L1, L10, L10, L1, L1, L10, L10, L1, L1, L1, L1, L1, L1, L1, and L1.

Referring back to FIG. 3, when the focus level map is obtained as described above, the perspective enhancement module 130 may receive the focus level map output from the focus level map generation module 110 and perform perspective enhancement on the input image. Perspective enhancement of an image may include luminance contrast enhancement, color contrast enhancement, or detail enhancement, etc.

Hereinafter, a perspective enhancement operation performed by the perspective enhancement module 130 will be described with reference to FIGS. 14 to 17.

Figure 14:
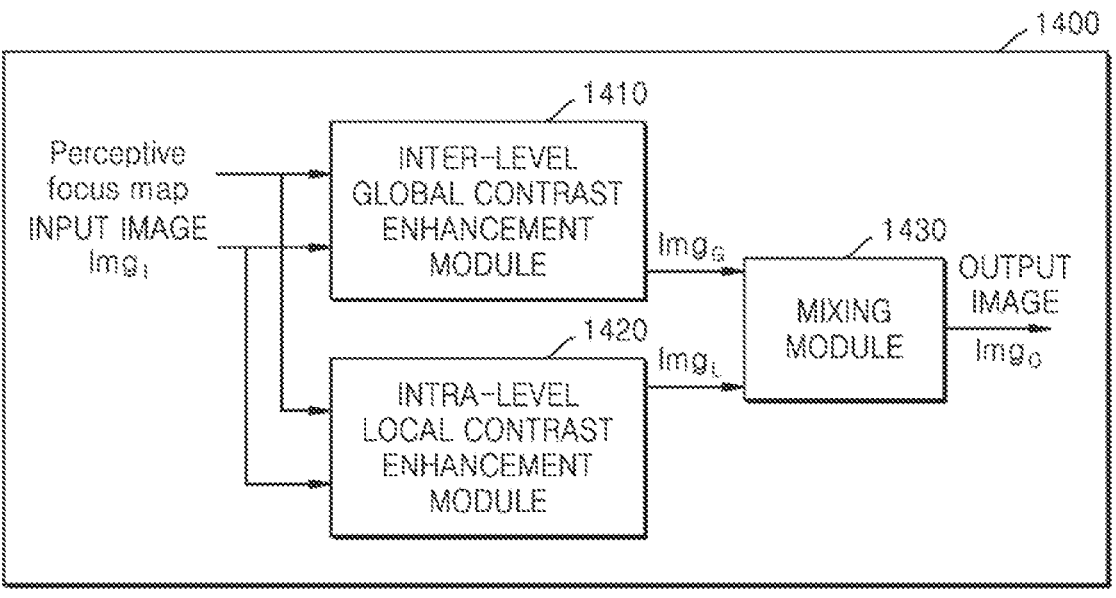
FIG. 14 illustrates an example of a luminance contrast enhancement module according to an embodiment of the disclosure.

FIG. 14 illustrates an example of a luminance contrast enhancement module 1400 according to an embodiment of the disclosure.

Referring to FIG. 14, the luminance contrast enhancement module 1400 may include an inter-level global contrast enhancement module 1410, an intra-level local contrast enhancement module 1420, and a mixing module 1430. $L_1$, $L_2$, . . . , $L_N$ represent local areas of N focus levels.

The inter-level global contrast enhancement module 1410 applies different gains $GY_1$, $GY_2$, . . . , $GY_N$ to dominant luminance values $Y_1$, $Y_2$, . . . , $Y_N$ corresponding to the N focus levels in order to differently improve initial global curves $TMC_{init}$ according to the respective N focus levels. $Y_1$, $Y_2$, . . . , $Y_N$ denote dominant luminance values of the N focus levels, respectively. For example, a first focus level dominant luminance value $Y_1$ may be an average of luminance values of pixels having a first focus level.

The initial global curve $TMC_{init}$ is a predetermined curve, and may be generated by, for example, histogram equalization or optimization. The inter-level global contrast enhancement module 1410 may generate a global curve $TMC_G$ by adjusting the dominant luminances $Y_1$, $Y_2$, . . . , $Y_N$ of the N focus levels by using different gains $GY_1$, $GY_2$, . . . , $GY_N$. Here, $GY_1$, $GY_2$, . . . , $GY_N$ may be set to satisfy $GY_1 > GY_2 > . . . > GY_N$ or $GY_1 < GY_2 < . . . < GY_N$ according to requirements defined by the user.

Figure 15:
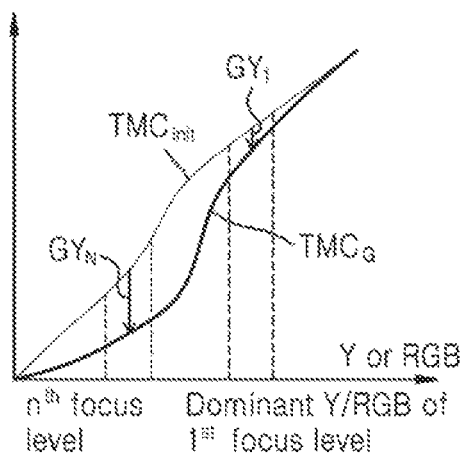
FIG. 15 illustrates a graph showing generation of a global curve $TMC_G$ from an initial global curve $TMC_{init}$, according to an embodiment of the disclosure.

FIG. 15 illustrates a graph showing generation of a global curve $TMC_G$ from an initial global curve $TMC_{init}$, according to an embodiment of the disclosure.

Referring to FIG. 15, the global curve $TMC_G$ may be generated by adjusting the dominant luminances $Y_1$, $Y_2$, . . . , $Y_N$ of the N focus levels in the initial global curve $TMC_{init}$ by using different gains $GY_1$, $GY_2$, . . . , $GY_N$.

The inter-level global contrast enhancement module 1410 may output a global contrast-enhanced image $Img_G$ as an output image by globally applying the generated global curve $TMC_G$ to all pixels of the input image.

The intra-level local contrast enhancement module 1420 may enhance a local contrast by enhancing local sharpness or applying a tone curve having local area characteristics.

The intra-level local contrast enhancement module 1420 may apply a filter mask (e.g., an unsharp mask) or tone mapping curves $TMC_{L1}$, $TMC_{L2}$, and $TMC_{LN}$ each having characteristics, to the respective focus level areas by $L_1$, $L_2$, . . . , $L_N$. Tone mapping is a signal processing method for transforming input signal (e.g., RGB, YCbCr, etc.) information of an image into levels desired by a user (e.g., a developer), and for example, by performing tone mapping, a dark portion or a bright portion of an image may be adjusted such that a detail is emphasized, black is highlighted, or the bright portion is further brightened.

Figure 16:
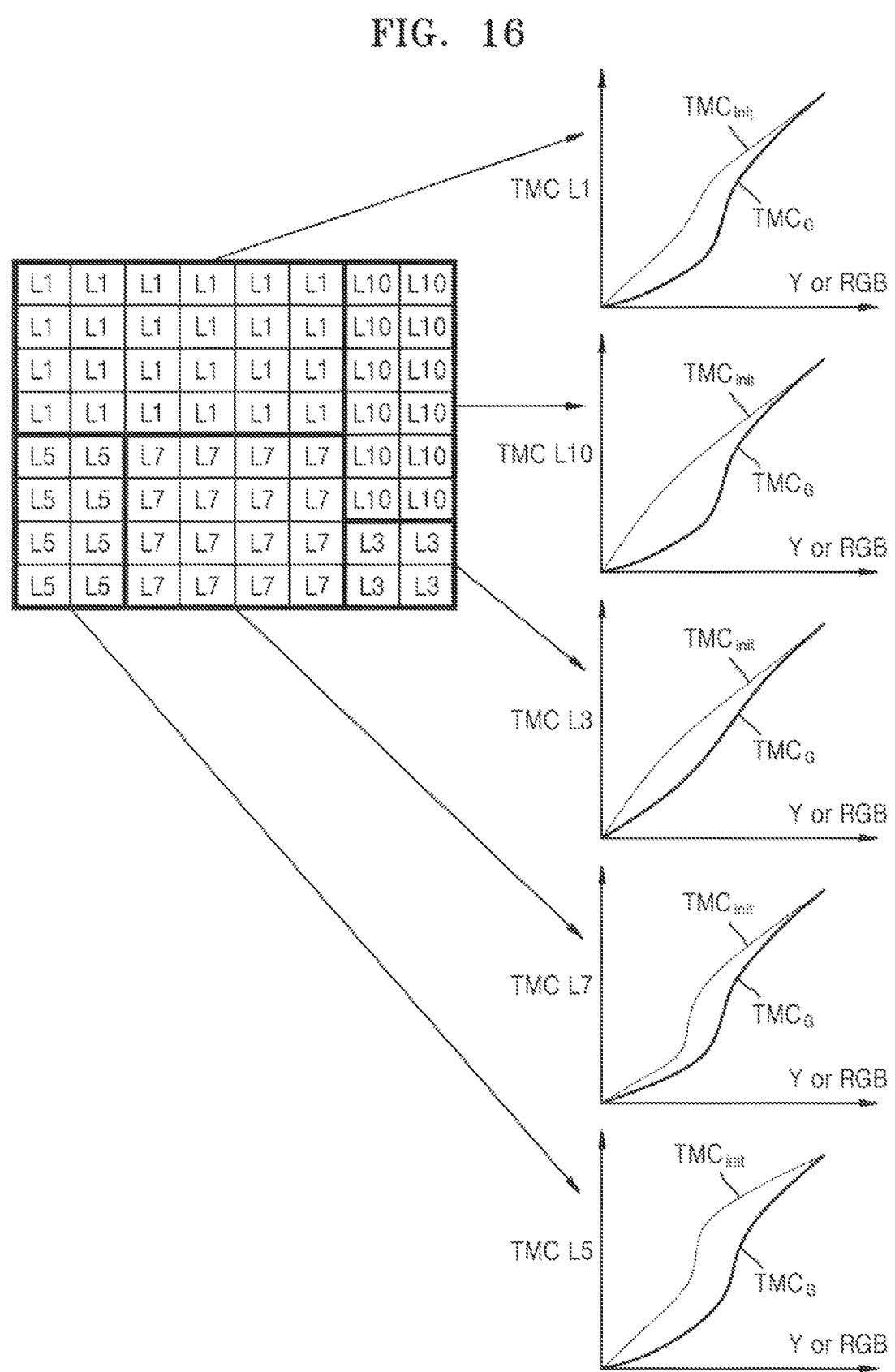
FIG. 16 is a reference diagram for describing an example of applying different tone mapping curves to respective focus level areas of an input image, according to an embodiment of the disclosure.

FIG. 16 is a reference diagram for describing an example of applying different tone mapping curves to respective focus level areas of an input image, according to an embodiment of the disclosure.

Referring to FIG. 16, according to an embodiment, an input image 1600 may include a focus level L1 area, a focus level L10 area, a focus level L5 area, a focus level L7 area, and a focus level L3 area. The intra-level local contrast enhancement module 1420 may output a local contrast-enhanced image $Img_L$ as an output image by applying, to the focus level L1 area of the input image, a corresponding tone mapping curve $TMC_{L1}$, applying, to the focus level L3 area of the input image, a corresponding tone mapping curve $TMC_{L3}$, applying, to the focus level L10 area of the input image, a corresponding tone mapping curve $TMC_{L10}$, applying, to the focus level L5 area of the input image, a corresponding tone mapping curve $TMC_{L5}$, and applying, to the focus level L7 area of the input image, a corresponding tone mapping curve $TMC_{L7}$.

The mixing module 1430 may perform mixing by blending a resulting image output from the inter-level global contrast enhancement module 1410 with a resulting image output from the intra-level local contrast enhancement module 1420.

$$Img_0 = Img_G \times p + Img_L(1-p)$$

Here, P denotes a user-defined ratio, $Img_G$ denotes a resulting image obtained by applying $TMC_G$, and $Img_L$ denotes a resulting image obtained by applying $TMC_{L1}$, $TMC_{L2}$, and $TMC_{LN}$ to focus level areas, respectively.

Figure 17:
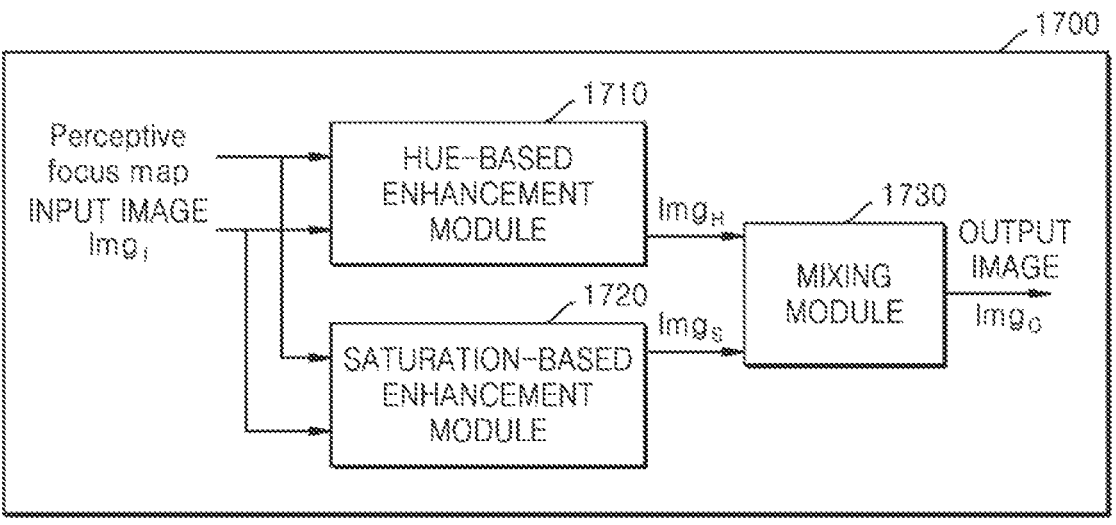
FIG. 17 illustrates an example of a color contrast enhancement module according to an embodiment of the disclosure.

FIG. 17 illustrates an example of a color contrast enhancement module 1700 according to an embodiment of the disclosure.

Referring to FIG. 17, the color contrast enhancement module 1700 may include a hue-based enhancement module 1710, a saturation-based enhancement module 1720, and a mixing module 1730.

The hue-based enhancement module 1710 may apply color enhancement gains $GH_1$, $GH_2$, ..., $GH_N$ to dominant hue values $H_1$, $H_2$, ..., $H_N$ corresponding to the N focus levels, respectively. $GH_1$, $GH_2$, ..., $GH_N$ may be defined by the user. $H_1$, $H_2$, ..., $H_N$ denote dominant hue values corresponding to the N focus levels, respectively. For example, a dominant hue value corresponding to a first focus level may be an average of hue values of pixels having the first focus level. However, using of an average as a representative value is merely an example, and various indexes, such as a highest value, a lowest value, or a median, may be used as a representative value.

The saturation-based enhancement module 1720 may apply saturation enhancement gains $GS_1$, $GS_2$, ..., $GS_N$ to dominant saturation values $S_1$, $S_2$, ..., $S_N$ corresponding to the N focus levels, respectively. $GS_1$, $GS_2$, ..., $GS_N$ may be defined by the user. $S_1$, $S_2$, ..., $S_N$ denote dominant saturation values corresponding to the N focus levels, respectively. For example, a dominant saturation value corresponding to a first focus level may be an average of saturation values of pixels having the first focus level. However, using of an average as a representative value is merely an example, and various indexes, such as a highest value, a lowest value, or a median, may be used as a representative value.

Figure 18:
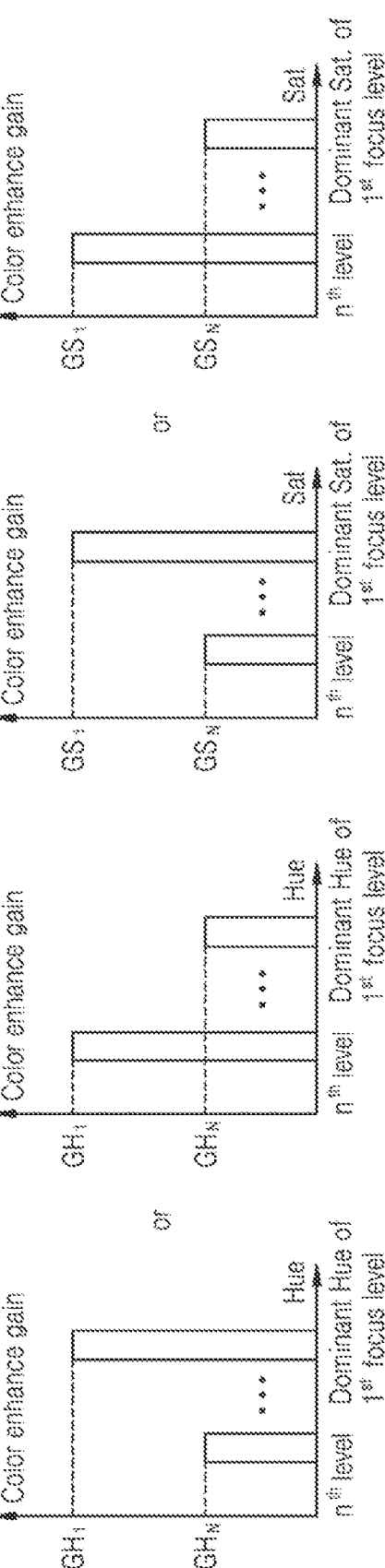
FIG. 18 illustrates examples of color enhancement gains and saturation enhancement gains according to an embodiment of the disclosure.

FIG. 18 illustrates examples of color enhancement gains and saturation enhancement gains according to an embodiment of the disclosure.

The mixing module 1730 may perform mixing by blending a resulting image output from the hue-based enhance-ment module 1710 with a resulting image output from the saturation-based enhancement module 1720.

$$Img_0 = Img_H \times p_c + Img_S(1-p_c)$$

Here, $p_c$ denotes a ratio defined by the user.

Hereinafter, a detail enhancement operation will be described with reference to FIG. 19.

Figure 19:
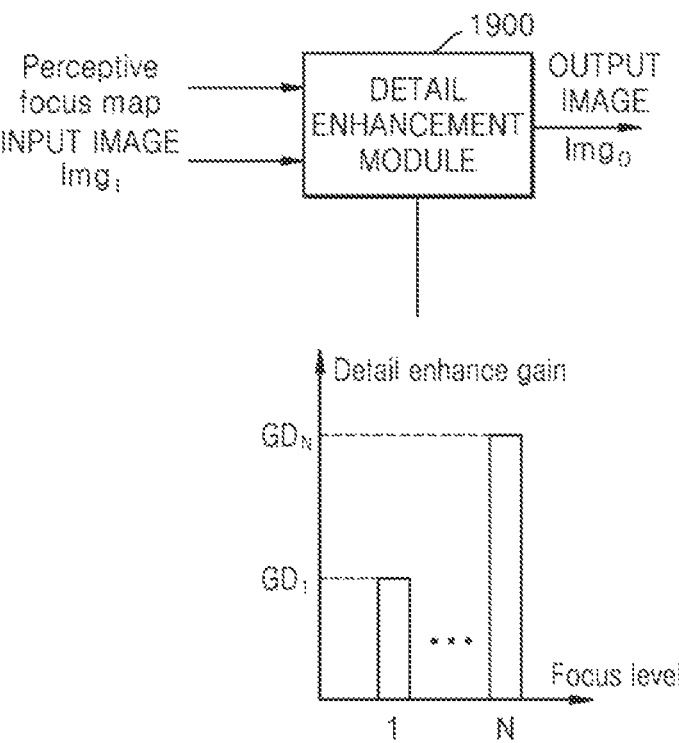
FIG. 19 illustrates an example of a detail enhancement module according to an embodiment of the disclosure.

FIG. 19 illustrates an example of a detail enhancement module 1900 according to an embodiment of the disclosure.

Referring to FIG. 19, the detail enhancement module 1900 may apply detail enhancement gains $GD_1$, $GD_2$, ..., $GD_N$ to the focus level areas $L_1$, $L_2$, ..., $L_N$ respectively. In detail, a higher gain may be applied to an in-focus area LN to improve a detail to be clear, and a lower gain may be applied to an area having a low focus level, such as a blur area, to maintain its blurriness.

Figure 20:
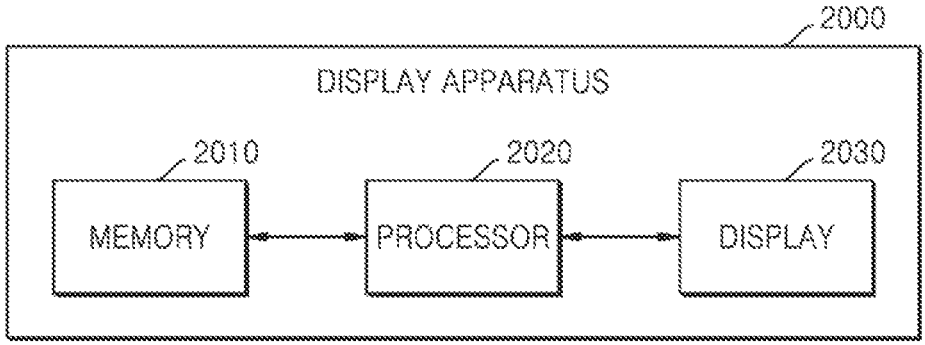
FIG. 20 is a block diagram of an example of a display apparatus according to an embodiment of the disclosure.

FIG. 20 is a block diagram of an example of the display apparatus 2000 according to an embodiment of the disclosure.

Referring to FIG. 20, the display apparatus 2000 according to an embodiment of the disclosure may include a memory 2010, a processor 2020, and a display 2030.

The memory 2010 may store various pieces of data, programs, or applications for operating and controlling the display apparatus 2000. In addition, the program stored in the memory 2010 may include one or more instructions. The program (i.e., one or more instructions) or application stored in the memory 2010 may be executed by the processor 2020.

According to an embodiment of the disclosure, the memory 2010 may include instructions for executing the image processing method described with reference to FIGS. 3 to 19. For example, the memory 2010 may include instructions for executing the operation of the focus level map generation module 110, instructions for executing the operation of the scene intensity prediction module 120, and instructions for executing the operation of the perspective enhancement module 130, which are illustrated in FIG. 3.

The processor 2020 controls the overall operation of the display apparatus 2000 and a signal flow between internal components of the display apparatus 2000, and processes data. The processor 2020 may include a single core, dual cores, triple cores, quad cores, or cores corresponding to a multiple thereof. In addition, the processor 2020 may include a plurality of processors. For example, the processor 2020 may be implemented as a main processor and a sub-processor operating in a sleep mode.

In addition, the processor 2020 may include at least one of a central processing unit (CPU), a graphics processing unit (GPU), or a video processing unit (VPU). Alternatively, according to an embodiment of the disclosure, the processor 2020 may be implemented as a system on a chip (SoC) into which at least one of a CPU, a GPU, or a VPU is integrated.

The processor 2020 according to an embodiment of the disclosure may include at least one of components included in an apparatus (or module) for performing the contrast enhancement illustrated in FIGS. 3 to 19.

The processor 2020 according to an embodiment of the disclosure may execute one or more instructions stored in the memory 2010 to receive an input image, obtain lumi-nance information from the received input image, obtain, based on the luminance information, perceptual luminance information in view of a visual response, predict scene intensity information indicating a degree of side effects that may occur after image quality processing is performed on the input image, obtain a focus level map based on the scene intensity information and the perceptual luminance information, and perform image quality processing on the input image by using the focus level map.

The processor 2020 according to an embodiment of the disclosure may execute the one or more instructions stored in the memory 2010 to obtain, from the received input image, the luminance information based on characteristic information of the display.

The processor 2020 according to an embodiment of the disclosure may execute the one or more instructions stored in the memory 2010 to obtain the perceptual luminance information from the luminance information by using an HVS model.

The processor 2020 according to an embodiment of the disclosure may execute the one or more instructions stored in the memory 2010 to extract a feature from the input image, and obtain, from the input image, the scene intensity information of the input image by using a neural network that is trained, based on training images, to output scene intensity information indicating intensity of a side effect that may occur after image quality processing is performed on the training images.

The processor 2020 according to an embodiment of the disclosure may execute the one or more instructions stored in the memory 2010 to obtain the focus level map by applying a weight to the perceptual luminance information by using the scene intensity information.

The processor 2020 according to an embodiment of the disclosure may by execute the one or more instructions stored in the memory 2010 to obtain a first focus level map by filtering the perceptual luminance information by using a predetermined filter, obtain a second focus level map by applying a weight to the first focus level map by using the scene intensity information, and obtain the focus level map by normalizing the second focus level map. The predetermined filter may include at least one of a Laplacian filter, a gradient filter, a variance filter, or a wavelet filter.

The processor 2020 according to an embodiment of the disclosure may execute the one or more instructions stored in the memory 2010 to perform the image quality processing by performing at least one of luminance contrast enhancement, color contrast enhancement, or detail enhancement on the input image by using the focus level map.

The processor 2020 according to an embodiment of the disclosure may execute the one or more instructions stored in the memory 2010 to obtain a global contrast-enhanced image by applying, to the input image, global tone mapping curves, which are obtained by adjusting dominant luminances of N focus levels of the focus level map by using different gains, obtain a local contrast-enhanced image by applying, to the input image, N different tone mapping curves, which correspond to respective areas corresponding to the N focus levels of the focus level map, and obtain an output image by mixing the global contrast-enhanced image with the local contrast-enhanced image.

The processor 2020 according to an embodiment of the disclosure may execute the one or more instructions stored in the memory 2010 to obtain a hue-based enhanced image by applying color enhancement gains to dominant hue values corresponding to the N focus levels of the focus level map, obtain a saturation-based enhanced image by applying saturation enhancement gains to dominant saturation values corresponding to the N focus levels of the focus level map, and obtain an output image by mixing the hue-based enhanced image with the saturation-based enhanced image.

The processor 2020 according to an embodiment of the disclosure may execute the one or more instructions stored in the memory 2010 to obtain an output image by applying detail enhancement gains to focus level areas of the focus level map, respectively.

The display 2030 according to an embodiment of the disclosure converts an image signal, a data signal, an on-screen display (OSD) signal, a control signal, or the like, that has been processed by the processor 2020, to generate a driving signal. The display 2030 may be implemented as a plasma display panel (PDP), a liquid-crystal display (LCD), an organic light-emitting diode (OLED), a flexible display, or a three-dimensional (3D) display. Also, the display 2030 may be configured as a touch screen to be used as both an output device and an input device.

The display 2030 according to an embodiment of the disclosure may display a second image having an improved contrast.

FIG. 21 is a block diagram illustrating a configuration of the display apparatus 2000 according to another embodiment of the disclosure.

Referring to FIG. 21, the display apparatus 2000 according to an embodiment of the disclosure may include the memory 2010, the processor 2020, the display 2030, a video processor 2035, an audio output unit 2040, an audio processor 2045, a communicator 2050, a sensor 2060, a user input unit 2070, an input/output unit 2080, and a tuner 2090.

The tuner 2090 according to an embodiment of the disclosure may be tuned to and select only a frequency of a channel desired to be received by the display apparatus 2000 from among a number of radio wave components by performing, for example, amplification, mixing, and resonance on a broadcast signal received in a wired or wireless manner. The broadcast signal includes audio, video, and additional information (e.g., an electronic program guide (EPG)).

The tuner 2090 may receive a broadcast signal from various sources such as terrestrial broadcasting, cable broadcasting, satellite broadcasting, or Internet broadcasting. The tuner 2090 may also receive a broadcast signal from a source such as analog broadcasting or digital broadcasting.

The communicator 2050 may transmit and receive data or signals to and from an external device or a server. For example, the communicator 2050 may include a Wi-Fi module, a Bluetooth module, an infrared communication module and a wireless communication module, a local area network (LAN) module, an Ethernet module, a wired communication module, etc. In this case, each communication module may be implemented as at least one hardware chip.

The Wi-Fi module and the Bluetooth module perform communication in a Wi-Fi scheme and a Bluetooth scheme, respectively. When the Wi-Fi module or the Bluetooth module is used, various pieces of connection information, such as a service set identifier (SSID) or a session key, may be first transmitted and received, and various pieces of information may be then transmitted and received after a communication connection is established by using the connection information. The wireless communication module may include at least one communication chip configured to perform communication according to various wireless communication standards, such as Zigbee, $3^{rd}$ Generation (3G), $3^{rd}$ Generation Partnership Project (3GPP), Long-Term Evolution (LTE), LTE Advanced (LTE-A), $4^{th}$ Generation (4G), $5^{th}$ Generation (5G), or the like.

The input/output unit 2080 receives a video (e.g., a moving image, etc.), an audio (e.g., a voice, a music, etc.), and additional information (e.g., an EPG, etc.) from the outside of the display apparatus 2000. The input/output unit 2080 may include any one of a high-definition multimedia interface (HDMI) port, a mobile high-definition link (MHL)

port, a universal serial bus (USB) port, a display port (DP), a Thunderbolt port, a video graphics array (VGA) port, an RGB port, a D-subminiature (D-SUB) port, a digital visual interface (DVI) port, a component jack, and a PC port. The sensor 2060 may detect a user's voice, a user's image, or a user's interaction, and may include a microphone 2061, a camera unit 2062, and an optical receiver 2063.

The microphone 2061 may receive a voice uttered by the user. The microphone 2061 may convert the received voice into an electrical signal and output the electrical signal to the processor 2020. User voices may include, for example, a voice corresponding to a menu or function of the display apparatus 2000.

The camera unit 2062 may receive an image (e.g., consecutive frames) corresponding to a motion of the user, including a gesture, within a recognition range of a camera. The processor 2020 may select a menu to be displayed on the display apparatus 2000 or perform a control operation, by using a result of recognizing the received motion.

The optical receiver 2063 may receive an optical signal (including a control signal) from an external control device through an optical window of a bezel of the display 2030. The optical receiver 2063 may receive, from the control device, an optical signal corresponding to a user input (e.g., a touch, a push, a touch gesture, a voice, or a motion). A control signal may be extracted from the received optical signal under the control by the processor 2020.

The processor 2020 controls the overall operation of the display apparatus 2000 and a signal flow between internal components of the display apparatus 2000, and processes data. When a user input is received or a preset and stored condition is satisfied, the processor 2020 may execute an operation system (OS) and various applications stored in the memory 2010.

In detail, the processor 2020 may include random-access memory (RAM) to store signals or data input from outside the processor 2020 or to be used as a storage for various operations performed by the processor 2020, read-only memory (ROM) storing a plurality of instructions and/or a control program for controlling the processor 2020, and a processor.

The video processor 2035 may process video data received by the display apparatus 2000. The video processor 2035 may perform various image processing operations such as decoding, scaling, noise filtering, frame rate conversion, resolution conversion, or the like, on the video data.

The audio processor 2045 may process audio data. The audio processor 2045 may perform various processing operations such as decoding, amplifying, noise filtering, or the like, on the audio data. The audio processor 2045 may include a plurality of audio processing modules to process audio data corresponding to a plurality of content items.

The audio output unit 2040 may output audio included in a broadcast signal received through the tuner 2090, under the control by the processor 2020. The audio output unit 2040 may output an audio (e.g., a voice or sound) input through the communicator 2050 or the input/output unit 2080. In addition, the audio output unit 2040 may output an audio stored in the memory 2010 under the control by the processor 2020. The audio output unit 2040 may include at least one of a speaker 2041, a headphone output port 2042, or a Sony/Philips digital interface (S/PDIF) output port 2043.

The memory 2010 may store various pieces of data, programs, or applications for operating and controlling the display apparatus 2000 under the control by the processor 2020. The memory 2010 may include a broadcast receiving module, a channel control module, a volume control module, a communication control module, a voice recognition module, a motion recognition module, a light receiving module, a display control module, an audio control module, an external input control module, a power control module, a power control module of an external device connected thereto in a wireless manner (e.g., Bluetooth), a voice database (DB), or a motion DB, which is not illustrated. The modules and the DBs of the memory 2010, which are not illustrated, may be implemented in the form of software for the display apparatus 2000 to perform a function of controlling broadcast reception, a channel control function, a volume control function, a communication control function, a voice recognition function, a motion recognition function, a light reception control function, a display control function, an audio control function, an external input control function, a power control function, or a power control function of an external device connected thereto in a wireless manner (e.g., Bluetooth). The processor 2020 may perform each function by using the software stored in the memory 2010.

In particular, according to an embodiment of the disclosure, the memory 2010 may include the focus level map generation module 110, the scene intensity prediction module 120, the perspective enhancement module 130, and component modules thereof, as illustrated in FIG. 3.

The block diagrams of the display apparatus 2000 illustrated in FIGS. 20 and 21 are merely examples. Each of the components illustrated in the block diagrams may be integrated, added, or omitted according to the specification of the display apparatus 2000 actually implemented. That is, two or more components may be integrated into one component, or one component may be divided into two or more components, as necessary. Also, a function performed by each block is for describing embodiments of the disclosure, and its detailed operation or device does not limit the scope of the disclosure.

An operating method of a display apparatus according to an embodiment of the disclosure may be embodied as program instructions executable by various computer devices, and recorded on a computer-readable medium. The computer-readable medium may include program instructions, data files, data structures, or the like separately or in combinations. The program instructions to be recorded on the medium may be specially designed and configured for the disclosure or may be well-known to and be usable by one of ordinary skill in the art of computer software. Examples of the computer-readable recording medium include magnetic media such as hard disks, floppy disks, or magnetic tapes, optical media such as compact disc ROMs (CD-ROMs) or digital video discs (DVDs), magneto-optical media such as optical disks, and hardware devices such as ROM, RAM, and flash memory, which are specially configured to store and execute program instructions. Examples of the program instructions include not only machine code, such as code made by a compiler, but also high-level language code that is executable by a computer by using an interpreter or the like.

Alternatively or in addition, the operating method of a display apparatus according to the embodiments of the disclosure may be provided in a computer program product. The computer program product may be traded between a seller and a purchaser as a commodity.

The computer program product may include a software (S/W) program and a computer-readable recording medium storing the S/W program. For example, the computer program product may include a product in the form of a software program electronically distributed (e.g., a downloadable application) through a manufacturer of an electronic device or an electronic market (e.g., Google Play Store, App Store). For electronic distribution, at least part of the S/W program may be stored in a storage medium or temporarily generated. In this case, the storage medium may be a storage medium of a server of the manufacturer or a server of the electronic market, or a relay server that temporarily stores the S/W program.

The computer program product may include a storage medium of a server or a storage medium of a client device, in a system consisting of the server and the client device. Alternatively, when there is a third device (e.g., a smart phone) communicatively connected to the server or the client device, the computer program product may include a storage medium of the third device. Alternatively, the computer program product may include the S/W program itself, which is transmitted from the server to the client device or the third device or transmitted from the third device to the client device.

In this case, one of the server, the client device, and the third device may execute the computer program product to perform the method according to the embodiments of the disclosure. Alternatively, two or more of the server, the client device, and the third device may execute the computer program product to execute the method according to the embodiments of the disclosure in a distributed manner.

For example, the server (e.g., a cloud server, an artificial intelligence server) may execute the computer program product stored in the server to control the client device communicatively connected to the server to perform the method according to the embodiments of the disclosure.

Although embodiments have been described above in detail, the scope of the disclosure is not limited thereto, and various modifications and alterations by one of ordinary skill in the art using the basic concept of the disclosure defined in the following claims also fall within the scope of the disclosure.

What is claimed is:

1. A display apparatus comprising:
a display;
a memory storing one or more instructions; and
a processor configured to execute the one or more instructions stored in the memory to:
    receive an input image,
    obtain luminance information from the input image,
    obtain perceptual luminance information based on the luminance information,
    predict scene intensity information indicating a probability of an occurrence of a side effect after a first image quality processing is performed on the input image, and
    perform the first image quality processing on the input image based on the scene intensity information and the perceptual luminance information.

2. The display apparatus of claim 1, wherein the processor is further configured to execute the one or more instructions to:
    obtain a focus level map based on the scene intensity information and the perceptual luminance information, and
    perform the first image quality processing on the input image by using the obtained focus level map.

3. The display apparatus of claim 2, wherein the processor is further configured to execute the one or more instructions to obtain the focus level map by applying a weight to the perceptual luminance information by using the scene intensity information.

4. The display apparatus of claim 3, wherein the processor is further configured to execute the one or more instructions to:
    obtain a first focus level map by filtering the perceptual luminance information by using a predetermined filter,
    obtain a second focus level map by applying a weight to the first focus level map by using the scene intensity information, and
    obtain the focus level map by normalizing the second focus level map.

5. The display apparatus of claim 4, wherein the predetermined filter includes at least one of a Laplacian filter, a gradient filter, a variance filter, or a wavelet filter.

6. The display apparatus of claim 2, wherein the processor is further configured to execute the one or more instructions to perform the first image quality processing by performing at least one of luminance contrast enhancement, color contrast enhancement, or detail enhancement on the input image by using the focus level map.

7. The display apparatus of claim 6, wherein the processor is further configured to execute the one or more instructions to:
    obtain a global contrast-enhanced image by applying, to the input image, global tone mapping curves, which are obtained by adjusting dominant luminances of N focus levels of the focus level map by using different gains,
    obtain a local contrast-enhanced image by applying, to the input image, N different tone mapping curves, which correspond to respective areas corresponding to the N focus levels of the focus level map, and
    obtain an output image by mixing the global contrast-enhanced image with the local contrast-enhanced image.

8. The display apparatus of claim 6, wherein the processor is further configured to execute the one or more instructions to:
    obtain a hue-based enhanced image by applying color enhancement gains to dominant hue values corresponding to N focus levels of the focus level map,
    obtain a saturation-based enhanced image by applying saturation enhancement gains to dominant saturation values corresponding to the N focus levels of the focus level map, and
    obtain an output image by mixing the hue-based enhanced image with the saturation-based enhanced image.

9. The display apparatus of claim 6, wherein the processor is further configured to execute the one or more instructions to obtain an output image by applying detail enhancement gains to focus level areas of the focus level map, respectively.

10. The display apparatus of claim 1, wherein the processor is further configured to execute the one or more instructions to obtain, from the input image, the luminance information based on characteristic information of the display.

11. The display apparatus of claim 10, wherein the processor is further configured to execute the one or more instructions to obtain the perceptual luminance information from the luminance information by using a human visual system (HVS) model.

12. The display apparatus of claim 1, wherein the processor is further configured to execute the one or more instructions to:
    obtain, from the input image, the scene intensity information of the input image by using a neural network, wherein the neural network is trained, based on training images, to output the scene intensity information indicating intensity of the side effect that occurs after a second image quality processing is performed on the training images.

13. A method of a display apparatus, the method comprising:

receiving an input image;

obtaining luminance information from the input image;

obtaining perceptual luminance information based on the luminance information;

predicting scene intensity information indicating a probability of an occurrence of a side effect after a first image quality processing is performed on the input image; and performing the first image quality processing on the input image based on the scene intensity information and the perceptual luminance information.

14. The method of claim 13, further comprising:

obtaining a focus level map based on the scene intensity information and the perceptual luminance information; and performing the first image quality processing on the input image by using the focus level map.

15. The method of claim 13, wherein the obtaining, based on the luminance information, the perceptual luminance information further comprises obtaining the perceptual luminance information by using a human visual system (HVS) model.

16. The method of claim 13, further comprising:

obtaining, from the input image, the scene intensity information of the input image by using a neural network, wherein, based on training images, the neural network is trained to output the scene intensity information indicating intensity of a side effect that occurs after a second image quality processing is performed on the training images.

17. A computer-readable recording medium having recorded thereon a program for performing a method of a display apparatus, the method comprising:

receiving an input image;

obtaining luminance information from the input image;

obtaining perceptual luminance information based on the luminance information;

predicting scene intensity information indicating a probability of an occurrence of a side effect that occurs after a first image quality processing is performed on the input image; and performing the first image quality processing on the input image based on the scene intensity information and the perceptual luminance information.

18. An image processing apparatus comprising:

a memory storing one or more instructions and including a scene intensity prediction module, a focus level map generation module, and a perspective enhancement module; and a processor configured to execute the one or more instructions to instruct:

the scene intensity prediction module to receive pixels of an input image and generate scene intensity information, the focus level map generation module to receive the pixels of the input image, receive the scene intensity information, generate a focus level map about the pixels of the input image at least based on the scene intensity information and the pixels of the input image, and the perspective enhancement module to receive the focus level map from the focus level map generation module and generate an output image, wherein:

the focus level map includes normalized values of focus response values for the pixels of the input image, and the focus response values correspond to the pixels and indicates degrees of sensitivity of human visual responses to the pixels of the input image.

19. The image processing apparatus of claim 18, wherein:

the output image includes at least one pixel in the pixels of the input image, based on the focus level map received from the focus level map generation module, and the at least one pixel included in the output image is enhanced by an enhancement processing performed by the perspective enhancement module.

20. The image processing apparatus of claim 19, wherein the enhancement processing is at least one of inter-level global contrast enhancement, intra-level local contrast enhancement, hue-based enhancement, saturation-based enhancement, or detail enhancement.

* * * * *